United States Patent
Kobayashi et al.

(10) Patent No.: US 11,518,147 B2
(45) Date of Patent: Dec. 6, 2022

(54) METHOD FOR RECYCLING INTERMEDIATE FILM FOR LAMINATED GLASS

(71) Applicant: KURARAY CO., LTD., Kurashiki (JP)

(72) Inventors: Takuya Kobayashi, Kurashiki (JP); Masaaki Hirahara, Kurashiki (JP); Takayuki Shimizu, Chiyoda-ku (JP); Tatsuya Ueda, Kurashiki (JP)

(73) Assignee: KURARAY EUROPE GMBH, Hattersheim (DE)

( * ) Notice: Subject to any disclaimer, the term of this patent is extended or adjusted under 35 U.S.C. 154(b) by 0 days.

(21) Appl. No.: 16/619,664

(22) PCT Filed: Jun. 8, 2018

(86) PCT No.: PCT/JP2018/022076
§ 371 (c)(1),
(2) Date: Dec. 5, 2019

(87) PCT Pub. No.: WO2018/225860
PCT Pub. Date: Dec. 13, 2018

(65) Prior Publication Data
US 2020/0147933 A1    May 14, 2020

(30) Foreign Application Priority Data
Jun. 8, 2017    (JP) .............................. JP2017-113557

(51) Int. Cl.
*B32B 17/10* (2006.01)
*B32B 7/02* (2019.01)
(Continued)

(52) U.S. Cl.
CPC .......... *B32B 17/1099* (2013.01); *B29B 17/00* (2013.01); *B29B 17/02* (2013.01);
(Continued)

(58) Field of Classification Search
None
See application file for complete search history.

(56) References Cited

U.S. PATENT DOCUMENTS 6,506,835 B1    1/2003    Hoffman
2008/0099143 A1*    5/2008    Fretwurst ................ B29B 17/00
156/701
(Continued)

FOREIGN PATENT DOCUMENTS

EP    2977404 A1    1/2016
EP    3064352 A1    9/2016
(Continued)

OTHER PUBLICATIONS

International Search Report dated Aug. 28, 2018 in PCT/JP2018/022076, 1 page.
(Continued)

*Primary Examiner* — Kelly M Gambetta
*Assistant Examiner* — Virak Nguon
(74) *Attorney, Agent, or Firm* — BakerHostetler

(57) ABSTRACT

The present invention relates to a method for recycling an intermediate film for laminated glass, comprising a step of separating a layer comprising an A layer and a layer comprising a B layer from the intermediate film for laminated glass (1) comprising at least the A layer and the B layer.

11 Claims, 1 Drawing Sheet

(51) Int. Cl.
    *B29B 17/00*     (2006.01)
    *B29B 17/02*     (2006.01)
    *B32B 27/08*     (2006.01)
    *B32B 27/30*     (2006.01)
    *B29K 29/00*     (2006.01)
    *B29K 96/00*     (2006.01)
    *B29K 101/12*     (2006.01)

(52) U.S. Cl.
    CPC ............ *B32B 7/02* (2013.01); *B32B 17/1033* (2013.01); *B32B 17/1055* (2013.01); *B32B 17/10678* (2013.01); *B32B 17/10743* (2013.01); *B32B 17/10761* (2013.01); *B29B 2017/0203* (2013.01); *B29B 2017/0217* (2013.01); *B29K 2029/14* (2013.01); *B29K 2096/005* (2013.01); *B29K 2101/12* (2013.01); *B32B 17/10559* (2013.01); *B32B 27/08* (2013.01); *B32B 27/30* (2013.01)

(56) References Cited

U.S. PATENT DOCUMENTS

| | | | | |
|---|---|---|---|---|
| 2010/0249253 | A1* | 9/2010 | Fernandez Acevedo | C08J 11/04 521/40 |
| 2014/0293201 | A1* | 10/2014 | Takeda | B32B 23/08 349/118 |
| 2015/0290968 | A1* | 10/2015 | Hannig | E04F 15/102 428/192 |
| 2016/0023448 | A1* | 1/2016 | Bookbinder | B32B 17/1099 156/250 |
| 2016/0122526 | A1 | 5/2016 | Chen | |
| 2016/0303831 | A1* | 10/2016 | Cloots | B32B 17/10348 |
| 2017/0361575 | A1 | 12/2017 | Kusudou et al. | |

FOREIGN PATENT DOCUMENTS

| | | |
|---|---|---|
| JP | 55-21280 A | 2/1980 |
| JP | 11-48248 A | 2/1999 |
| JP | 11-277537 A | 10/1999 |
| JP | 2005-29083 A | 2/2005 |
| JP | 2014-226935 A | 12/2014 |
| JP | 2016-69279 A | 5/2016 |
| WO | 2015/059828 A1 | 4/2015 |
| WO | 2015/059829 A1 | 4/2015 |
| WO | 2015/059831 A1 | 4/2015 |
| WO | WO 2016/076336 A1 | 5/2016 |

OTHER PUBLICATIONS

International Preliminary Report on Patentability and Written Opinion dated Aug. 28, 2018 in PCT/JP2018/022076, 8 pages (submitting English translation only).

Extended European Search Report dated Feb. 16, 2021 in EP Application No. 18812597.5.

* cited by examiner

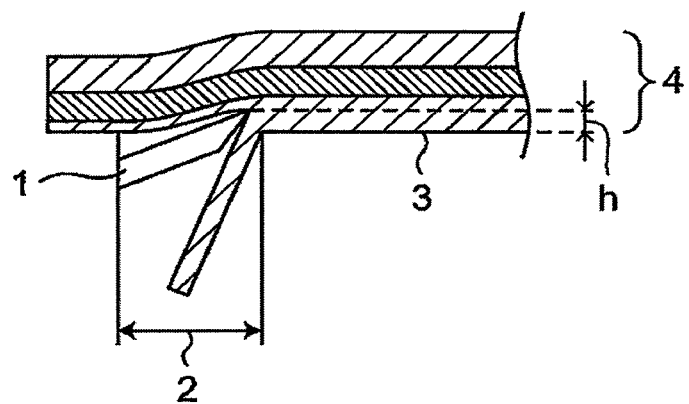

METHOD FOR RECYCLING INTERMEDIATE FILM FOR LAMINATED GLASS

TECHNICAL FIELD

The present invention relates to a method for recycling an intermediate film for laminated glass, an intermediate film for laminated glass obtained by the method for recycling an intermediate film for laminated glass, a laminated glass obtained by use of the intermediate film for laminated glass, and a method for producing the intermediate film for laminated glass.

BACKGROUND ART

A sheet obtained by forming a composition comprising of a polyvinyl acetal resin represented by a polyvinyl butyral resin and a plasticizer or a composition comprising an ionomer resin is widely used as an intermediate film for laminated glass because of its excellent adhesiveness with glass and transparency and mechanical strength (hereinafter, an intermediate film for laminated glass may be simply referred to as "an intermediate film").

In recent years, from the viewpoints of ecology and economy, it has been proposed to recycle trim and an off-spec product generated in manufacturing processes of an intermediate film and a laminated glass to obtain an intermediate film. For example, Patent Document 1 discloses an intermediate film for laminated glass comprising a polyvinyl acetal resin, a resin component different from the polyvinyl acetal resin, and a copolymer, and having a low haze after re-kneading. Patent Document 2 discloses a laminate which contains a polyvinyl acetal having a specific structure and a specific amount of a plasticizer and has a low haze after a simulated recycling test.

PRIOR ART DOCUMENTS

Patent Documents

Patent Document 1: JP 2016-069279 A
Patent Document 2: JP 2014-226935 A

SUMMARY OF THE INVENTION

Problems to be Solved by the Invention

However, the intermediate film for laminated glass disclosed in Patent Document 1 and the laminate disclosed in Patent Document 2 cannot be said to have a sufficiently low haze after recycle. For example, in a case where a very high transparency is required, such as a case of a car front glass, there is room for further improvement.

It is an object of the present invention to provide a method for recycling an intermediate film for laminated glass which can provide a new intermediate film for laminated glass with a sufficiently low haze and sufficiently high transparency when the intermediate film for laminated glass is recycled to produce the new intermediate film for laminated glass.

Solutions to the Problems

The present inventors arrived at the present inventions as a result of intensive studies to solve the above problems. That is, the present inventions are achieved by providing the following:

[1] A method for recycling an intermediate film for laminated glass, comprising a step of separating a layer comprising an A layer and a layer comprising a B layer from the intermediate film for laminated glass (1) comprising at least the A layer and the B layer;

[2] The method for recycling an intermediate film for laminated glass according to the above [1], wherein the layer comprising the A layer and/or the layer comprising the B layer which are separated in said step are used as at least part of raw materials to produce an intermediate film for laminated glass (2);

[3] The method for recycling an intermediate film for laminated glass according to the above [1] or [2], wherein said step is performed by peeling an interface between the A layer and the B layer;

[4] The method for recycling an intermediate film for laminated glass according to the above [1] or [2], wherein said step is performed by cutting the A layer and/or the B layer;

[5] The method for recycling an intermediate film for laminated glass according to any one of the above [1] to [3], wherein the intermediate film for laminated glass (1) comprises the A layer and the B layers laminated on both surfaces of the A layer;

[6] The method for recycling an intermediate film for laminated glass according to any one of the above [1] to [5], wherein the A layer and/or the B layer contain at least one resin selected from the group consisting of a polyvinyl acetal resin, an ionomer resin and a thermoplastic elastomer;

[7] The method for recycling an intermediate film for laminated glass according to any one of the above [1] to [6], wherein the A layer and the B layer contain a polyvinyl acetal resin;

[8] The method for recycling an intermediate film for laminated glass according to the above [7], wherein the A layer and the B layer further contain a plasticizer;

[9] The method for recycling an intermediate film for laminated glass according to any one of the above [1] to [6], wherein the A layer contains a thermoplastic elastomer and the B layer contains an ionomer resin;

[10] An intermediate film for laminated glass obtained by the method for recycling an intermediate film for laminated glass according to any one of the above [1] to [9];

[11] A laminated glass, comprising at least two glasses, and the intermediate film for laminated glass according to the above [10] arranged between the at least two glasses;

[12] A method for producing an intermediate film for laminated glass, comprising a step of separating a layer comprising an A layer and a layer comprising a B layer from an intermediate film for laminated glass (1) comprising at least the A layer and the B layer, wherein the layer comprising the A layer and/or the layer comprising the B layer which are separated are used as raw materials.

Effects of the Invention

The present inventions can provide a method for recycling an intermediate film for laminated glass which can provide a new intermediate film for laminated glass with a sufficiently low haze and sufficiently high transparency when the intermediate film for laminated glass is recycled to produce the new intermediate film for laminated glass. In addition, the present inventions can provide the new intermediate film for laminated glass obtained by the method for recycling, a laminated glass obtained by use of the new intermediate film for laminated glass, and a method for producing the new intermediate film for laminated glass.

BRIEF DESCRIPTION OF THE DRAWINGS

FIG. 1 illustrates a schematic view of a state in which a lowermost layer of an intermediate film for laminated glass (1) having a three-layer structure of B layer/A layer/B layer is cut with a slicer.

EMBODIMENTS OF THE INVENTION

Hereinafter, embodiments of the present inventions are explained, but the present inventions are not limited to the embodiments.

(Method for Separating Layer Comprising A Layer and Layer Comprising B Layer from Intermediate Film for Laminated Glass (1))

A method for separating the layer comprising the A layer and the layer comprising the B layer from the intermediate film for laminated glass (1) is not particularly limited. Examples of the method include a method for peeling the interface between the A layer and the B layer, a method for cutting the A layer and/or the B layer, a method for abrading the A layer and/or the B layer, and a method for dissolving the A layer and/or the B. An apparatus for implementing those methods is not limited. Any apparatus well-known can be used. The method for peeling the interface between the A layer and the B layer can be implemented by hand without use of an apparatus. The method for separating the layer comprising the A layer and the layer comprising the B layer from the intermediate film for laminated glass (1) itself can be also applied in various applications other than the method for recycling the intermediate film for laminated glass of the present invention. For example, by use of the method, a thickness of an intermediate film for laminated glass can be adjusted, a formed article other than an intermediate film for laminated glass can be produced from the intermediate film for laminated glass (1), or the A layer and/or the B layer which are separated from the intermediate film for laminated glass (1) can be recycled by using as at least part of raw materials to produce a formed article other than an intermediate film for laminated glass.

A method for cutting the A layer and/or the B layer is not particularly limited. Examples of the method include a knife processing method, a laser processing method and a water jet processing method. Among them, the knife processing method is preferable from the viewpoint of more easily obtaining a uniform thickness of a cut sheet. As a device for cutting the intermediate film for laminated glass (1) by the knife processing method, a slice device comprising a smooth board face with a slit and a blade projected from the slit, such as a plane or a slicer which has a sharp blade can be used. In a case where the slice device is used, a blade height projected from the board surface (distance from the board face to a top of the blade) is preferably 0.10 mm or more, more preferably 0.13 mm or more. A shape of a knife used in the knife processing method is not limited, and examples thereof include single-edged shape, double-edged shape and asymmetric shape. A knife with single-edged shape is preferable from the viewpoint of more easily obtaining accuracy of a thickness. The A layer and/or the B layer with a thickness greater than the blade height projected from the board surface can be separated by cutting the intermediate film for laminated glass (1) while pressing the intermediate film for laminated glass (1) against the board face. A material of the knife used in the knife processing method is not particularly limited, and examples thereof include cemented carbide, carbon tool steel, alloy tool steel and high-speed tool steel. A surface temperature of the intermediate film for laminated glass (1) when cutting the intermediate film for laminated glass (1) by the knife processing method is preferably 20° C. or less, more preferably 15° C. or less, from the viewpoint of suppressing adhesion of the intermediate film for laminated glass (1) and more easily cutting the intermediate film for laminated glass (1).

A state of each layer after separating the layer comprising the A layer and the layer comprising the B layer from the intermediate film for laminated glass (1) is not particularly limited. For examples, the intermediate film for laminated glass (1) may be separated to the layer comprising the A layer and the B layer, to the A layer and the layer comprising the B layer, or to the A layer, the B layer and a layer other than the said layers. It may be also separated to each layer of all layers constituting the intermediate film for laminated glass (1). That is, in a case where, for example, the intermediate film for laminated glass (1) has a three-layer structure of B layer/A layer/B layer, it may be separated to the B layer and the B layer/A layer to recycle, or the obtained B layer/A layer may be further separated to the B layer and the A layer to recycle.

The layer comprising the A layer and the layer comprising the B layer obtained by separating the layer comprising the A layer and the layer comprising the B layer from the intermediate film for laminated glass (1) are preferably a layer comprising the A layer as a main component and a layer comprising the B layer as a main component, respectively. In the present specification, "a layer comprising the A layer as a main component" means a layer having a content of the A layer of 60% by mass or more, (preferably 80% by mass or more, more preferably 90% by mass or more, even more preferably 95% by mass or more, especially preferably 98% by mass or more, most preferably 100% by mass). Also, "a layer comprising the B layer as a main component" means a layer having a content of the B layer of 60% by mass or more, (preferably 80% by mass or more, more preferably 90% by mass or more, even more preferably 95% by mass or more, especially preferably 98% by mass or more, most preferably 100% by mass). When each layer obtained by separating the layer comprising the A layer and the layer comprising the B layer from the intermediate film for laminated glass (1) satisfies any one of the above embodiments, transparency of a resulting intermediate film for laminated glass (2) tends to become good, and thus, the method of the present invention for recycling an intermediate film for laminated glass becomes a more useful method.

In the layer comprising the A layer and the layer comprising the B layer obtained by separating the layer comprising the A layer and the layer comprising the B layer from an intermediate film for laminated glass (1) a ratio of each layer used for producing an intermediate film for laminated glass (2) is preferably 30% by mass or more, more preferably 40% by mass or more, even more preferably 50% by mass or more. When the ratio is high, recycle efficiency is high.

(Intermediate Film for Laminated Glass (1))

A laminated constitution of the intermediate film for laminated glass (1) may be appropriately decided depending on use or purpose of the laminated glass. The laminated constitution may be a two-layer structure of B layer/A layer, a three-layer structure of B layer/A layer/B layer, or other laminated constitution such as B layer/A layer/B layer/A layer, B layer/A layer/B layer/A layer/B layer, B layer/A layer/B layer/A layer/B layer/A layer, and B layer/A layer/B layer/A layer/B layer/A layer/B layer. Among them, the intermediate film for laminated glass (1) preferably has a laminated constitution of an A layer and B layers laminated on both surfaces of the A layer. In a case where each of these laminated constitutions comprises two or more A layers or B layers, components constituting each A layer or each B layer may be the same as or different from each other. Both outermost layers are preferably the B layer, from the viewpoint of adhesion to a glass.

The intermediate film for laminated glass (1) also may comprise one or more layer (referred to as a C layer) other than the A layer and the B layer. Examples of such a laminated constitution include B layer/A layer/C layer/B layer, B layer/A layer/B layer/C layer, B layer/C layer/A layer/C layer/B layer, B layer/C layer/A layer/B layer/C layer, B layer/A layer/C layer/B layer/C layer, C layer/B layer/A layer/B layer/C layer, C layer/B layer/A layer/C layer/B layer/C layer, and C layer/B layer/C layer/A layer/C layer/B layer/C layer. In a case where each of the above laminated constitutions comprises two or more A layers, components constituting each A layer may be the same as or different from each other. This is also applied to the B layer and the C layer. Both outermost layers are preferably the B layer, from the viewpoint of adhesion to a glass.

In the present invention, the A layer and/or the B layer in the intermediate film for laminated glass (1) preferably comprise a thermoplastic resin. Among thermoplastic resins, the A layer and/or the B layer preferably comprise at least one selected from the group consisting of a polyvinyl acetal resin, an ionomer resin and a thermoplastic elastomer. Among embodiments, an embodiment in which the A layer and the B layer comprise the polyvinyl acetal resin, and an embodiment in which the A layer comprises the thermoplastic elastomer and the B layer comprises the ionomer resin are especially preferable. In these especially preferable embodiments, the resulting laminated glass (2) is excellent in transparency, sound insulation, mechanical properties, durability and other properties.

In a case where the A layer and/or the B layer in the intermediate film for laminated glass (1) comprise the polyvinyl acetal resin, the method for cutting the A layer and/or the B layer is preferably as the method for separating the layer comprising the A layer and the layer comprising the B layer from the viewpoint of increasing the content of the A layer in the layer comprising the A layer as a main component.

(Polyvinyl Acetal Resin)

In the present invention, an average acetalization degree of the polyvinyl acetal resin is preferably 40 mol % or more, more preferably 50 mol % or more. The average acetalization degree of the polyvinyl acetal resin is preferably 90 mol % or less, more preferably 80 mol % or less. When the above average acetalization degree is 40 mol % or more, it tends to be excellent in compatibility with a solvent such as a plasticizer. When the above average acetalization degree is 90 mol % or less, it tends to achieve preferable process since a reaction to obtain the polyvinyl acetal resin does not require a long time.

An average content of the vinyl acetate unit of the polyvinyl acetal resin is preferably 30 mol % or less, more preferably 20 mol % or less. When the average content of the vinyl acetate unit is 30 mol % or less, blocking when producing the polyvinyl acetal resin is hard to occur, and thus, the polyvinyl acetal resin is more easily produced. The lower limit value of the average content of the vinyl acetate unit is not particularly limited, but is usually 0.1 mol % or more.

An average content of the vinyl alcohol unit of the polyvinyl acetal resin is preferably 5 mol % or more, more preferably 15 mol % or more. An average content of the vinyl alcohol unit of the polyvinyl acetal resin is preferably 50 mol % or less, more preferably 40 mol % or less. When the average content of the vinyl alcohol unit is 5 mol % or more, it tends to be excellent in adhesion to a glass. When the average content of the vinyl alcohol unit is 50 mol % or less, it tends to be excellent in water resistance.

The polyvinyl acetal resin is generally constituted of the vinyl acetal unit, the vinyl alcohol unit and the vinyl acetate unit, and these respective units can be measured by the "Test Method for Polyvinyl Butyral" of JIS K 6728 or a nuclear magnetic resonance method (NMR).

When the polyvinyl acetal resin contains a unit other than the vinyl acetal unit, by measuring a quantity of the vinyl alcohol unit and a quantity of the vinyl acetate unit and subtracting these both unit quantities from a quantity of the vinyl acetal unit in the case of not containing a unit other than the vinyl acetal unit, the remaining vinyl acetal unit quantity can be calculated.

The polyvinyl acetal resin can be produced by a conventional well-known method, representatively by acetalization of polyvinyl alcohol with aldehydes. Concretely, examples of such a method include a method in which polyvinyl alcohol is dissolved in hot water, a required acid catalyst and required aldehydes are added to the resulting aqueous solution while maintaining the temperature of the aqueous solution at the defined temperature (preferably 0° C. or more, more preferably 10° C. or more, preferably 90° C. or less, more preferably 20° C. or less), the aqueous solution is stirred to proceed an acetalization reaction, then a reaction temperature is increased to preferably 70° C. or more to complete the reaction, and thereafter, a neutralization step, a washing step with water and a dry step are performed to obtain powders of the polyvinyl acetal resin.

The viscosity average polymerization degree of polyvinyl alcohol which is a raw material of the polyvinyl acetal resin is preferably 500 or more, more preferably 1000 or more, and even more preferably 1500 or more. When the viscosity average polymerization degree of polyvinyl alcohol is 500 or more, a laminated glass obtained by use of the resulting intermediate film for laminated glass (2) tends to be excellent in penetration resistance. The viscosity average polymerization degree of polyvinyl alcohol is preferably 5000 or less, more preferably 3000 or less, even more preferably 2600 or less. When the viscosity average polymerization degree of polyvinyl alcohol is 5000 or less, good forming properties tend to be obtained more easily.

The values of preferable viscosity average polymerization degree of the polyvinyl acetal resin are the same as the values of preferable viscosity average polymerization degree of polyvinyl alcohol which is a raw material of the polyvinyl acetal resin.

In order to adjust the average content of the vinyl acetate unit of the resulting polyvinyl acetal resin to 30 mol % or less, it is preferable to use polyvinyl alcohol with a saponification degree of 70 mol % or more. When the polyvinyl alcohol has a saponification degree of 70 mol % or more, the resin tends to have excellent transparency and heat resistance, and reactivity with aldehydes is good. The saponification degree is more preferably 95 mol % or more. An upper limit value of the saponification degree of said polyvinyl alcohol is not particularly limited, but is usually 100 mol % or less.

The viscosity average polymerization degree and the saponification degree of the polyvinyl alcohol can be measured, for example, based on the "Test Method for Polyvinyl Alcohol" of JIS K 6726.

As the aldehydes used for acetalization of polyvinyl alcohol, aldehydes with 1 or more and 12 or less carbon atoms are preferably used. When the number of carbon atoms in the aldehydes is 12 or less, reactivity of acetalization tends to be good and formation of block of a resin during the reaction is more easily suppressed, and thus, synthesis of the polyvinyl acetal resin tends to be easier.

The aldehydes are not particularly limited. Examples thereof include aliphatic, aromatic or alicyclic aldehydes such as formaldehyde, acetaldehyde, propionaldehyde, n-butyraldehyde, isobutyraldehyde, valeraldehyde, n-hexylaldehyde, 2-ethylbutyraldehyde, n-heptylaldehyde, n-octylaldehyde, n-nonylaldehyde, n-decylaldehyde, benzaldehyde and cinnamaldehyde. Among them, aliphatic aldehydes with 2 or more and 6 or less carbon atoms are preferable, and n-butyraldehyde is especially preferable. The above aldehydes may be used alone, or may be used in combination of two or more. In addition, polyfunctional aldehydes or aldehydes with a functional group other than an aldehyde group may be co-used in an amount of 20% by mass or less of the mass of all aldehydes.

As the polyvinyl acetal resin, a polyvinyl butyral resin is most preferable. As the polyvinyl butyral resin, a modified polyvinyl butyral resin may be used which is obtained by butyralization of a polyvinyl alcohol-based polymer obtained by saponification of a copolymer of a vinyl ester with a monomer other than the vinyl ester by use of butyraldehyde. Examples of the monomer other than the vinyl ester include α-olefins such as ethylene, propylene, 1-butene, isobutene and 1-hexene; carboxylic acids or derivatives thereof such as fumaric acid, maleic acid, itaconic acid, maleic anhydride and itaconic anhydride; acrylic acid or its salt; acrylic esters such as methyl acrylate, ethyl acrylate, n-propyl acrylate and isopropyl acrylate; methacrylic acid or its salt; methacrylic acid esters such as methyl methacrylate, ethyl methacrylate, n-propyl methacrylate and isopropyl methacrylate; acrylamide derivatives such as acrylamide, N-methyl acrylamide and N-ethyl acrylamide; methacrylamide derivatives such as methacrylamide, N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether, hydroxy group-containing vinyl ethers such as ethylene glycol vinyl ether, 1,3-propanediol vinyl ether and 1,4-butanediol vinyl ether, allyl acetate; allyl ethers such as propyl allyl ether, butyl allyl ether and hexyl allyl ether; monomers with an oxyalkylene group; isopropenyl acetate; hydroxy group-containing α-olefins such as 3-buten-1-ol, 4-penten-1-ol, 5-hexen-1-ol, 7-octen-1-ol and 9-decen-1-ol and 3-methyl-3-buten-1-ol; monomers with a sulfonic acid group such as ethylenesulfonic acid, allylsulfonic acid, methallylsulfonic acid and 2-acrylamide-2-methylpropanesulfonic acid; monomers with a cationic group such as vinyloxyethyltrimethylammonium chloride, vinyloxybutyltrimethylammonium chloride, N-acrylamide methyltrimethylammonium chloride, N-acrylamide ethyltrimethylammonium chloride, allyl trimethylammonium chloride and methallyl trimethylammonium chloride; monomers with an amino group such as vinyloxy ethyldimethylamine, vinyloxy methyldiethylamine, N-acrylamide dimethylamine, dimethylallylamine and allylethylamine; monomers with a silyl group such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide-propyltrimethoxysilane and 3-(meth)acrylamide-propyltriethoxysilane. An amount of the monomer other than the vinyl ester when copolymerizing the vinyl ester with the monomer other than the vinyl ester varies depending on purpose and use thereof. Usually, the amount is preferably 20 mol % or less, more preferably 10 mol % or less of units of all monomers used for copolymerization.

(Plasticizer)

In a case where the polyvinyl acetal resin is used in the A layer and the B layer, a plasticizer may be further added. The plasticizer used in the A layer and the B layer is not particularly limited. Examples thereof include carboxylic acid ester-based plasticizers such as monovalent carboxylic acid esters and polyvalent carboxylic acid esters; phosphate ester-based plasticizers; organic phosphite ester-based plasticizers; polymer plasticizers such as carboxylic acid polyesters, carbonic acid polyesters and polyalkylene glycol; hydroxycarboxylic acid ester-based plasticizers such as an ester compound of a hydroxycarboxylic acid with a polyhydric alcohol such as a castor oil and an ester compound of a hydroxycarboxylic acid with a monohydric alcohol.

Examples of the monovalent carboxylic acid ester-based plasticizer include a compound obtained by a condensation reaction of a monovalent carboxylic acid such as butanoic acid, isobutanoic acid, hexanoic acid, 2-ethylbutanoic acid, heptanoic acid, octylic acid, 2-ethylhexanoic acid and lauric acid with a polyhydric alcohol such as ethylene glycol, diethylene glycol, triethylene glycol, tetraethylene glycol, polyethylene glycol, polypropylene glycol and glycerin. Concrete examples thereof include triethylene glycol di-2-diethyl butanoate, triethylene glycol diheptanoate, triethylene glycol di-2-ethyl hexanoate, triethylene glycol dioctanoate, tetraethylene glycol di-2-ethyl butanoate, tetraethylene glycol di-heptanoate, tetraethylene glycol di-2-ethyl hexanoate, tetraethylene glycol di-octanoate, diethylene glycol di-2-ethyl hexanoate, PEG #400 di-2-ethyl hexanoate, triethylene glycol mono-2-ethyl hexanoate, a completely or partially esterified product of glycerin or diglycerin with 2-ethylhexanoic acid. PEG #400 means polyethylene glycol with an average molecular weight of 350 to 450.

Examples of the polyvalent carboxylic acid ester-based plasticizer include a compound obtained by a condensation reaction of a polyvalent carboxylic acid such as adipic acid, succinic acid, azelaic acid, sebacic acid, phthalic acid, isophthalic acid, terephthalic acid and trimellitic acid with an alcohol with 1 to 12 carbon atoms such as methanol, ethanol, butanol, hexanol, 2-ethylbutanol, heptanol, octanol, 2-ethylhexanol, decanol, dodecanol, butoxyethanol, butoxyethoxyethanol and benzyl alcohol. Concrete examples thereof include dihexyl adipate, di-2-ethylbutyl adipate, diheptyl adipate, dioctyl adipate, di-2-ethylhexyl adipate, di(butoxyethyl) adipate, di(butoxyethoxyethyl) adipate, mono(2-ethylhexyl) adipate, dibutyl sebacate, dihexyl sebacate, di-2-ethylbutyl sebacate, dibutyl phthalate, dihexyl phthalate, di(2-ethylbutyl) phthalate, dioctyl phthalate, di(2-ethylhexyl) phthalate, benzylbutyl phthalate and didodecyl phthalate.

Examples of the phosphoric acid-based plasticizer or the phosphorous acid-based plasticizer include a compound obtained by a condensation reaction of phosphoric acid or phosphorous acid with an alcohol with 1 to 12 carbon atoms such as methanol, ethanol, butanol, hexanol, 2-ethylbutanol, heptanol, octanol, 2-ethylhexanol, decanol, dodecanol, butoxyethanol, butoxyethoxyethanol and benzyl alcohol. Concrete examples thereof include trimethyl phosphate, triethyl phosphate, tripropyl phosphate, tributyl phosphate, tri(2-ethylhexyl) phosphate, tri(butoxyethyl) phosphate and tri(2-ethylhexyl) phosphite.

Examples of the carboxylic acid polyester-based plasticizer include a carboxylic acid polyester obtained by alternating copolymerization of a polyvalent carboxylic acid such as oxalic acid, malonic acid, succinic acid, adipic acid, suberic acid, sebacic acid, dodecanedioic acid, 1,2-cyclohexane dicarboxylic acid, 1,3-cyclohexane dicarboxylic acid and 1,4-cyclohexane dicarboxylic acid with a polyhydric alcohol such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl) cyclohexane, 1,3-bis(hydroxymethyl) cyclohexane and 1,4-bis(hydroxymethyl) cyclohexane; a polymer (hydroxycarboxylic acid polyester) of an aliphatic hydroxycarboxylic acid such as glycolic acid, lactic acid, 2-hydroxybutyric acid, 3-hydroxybutyric acid, 4-hydroxybutyric acid, 6-hydroxyhexanoic acid, 8-hydroxyhexanoic acid, 10-hydroxydecanoic acid and 12-hydroxydodecanoic acid or of a hydroxycarboxylic acid such as a hydroxycarboxylic acid with an aromatic ring such as 4-hydroxybenzoic acid and 4-(2-hydroxyethyl) benzoic acid; and a carboxylic acid polyester obtained by ring-opening polymerization of an aliphatic lactone compound such as γ-butyrolactone, γ-valerolactone, δ-valerolactone, β-methyl-δ-valerolactone, δ-hexanolactone, ε-caprolactone and lactide or of a lactone compound such as a lactone compound with an aromatic ring such as phthalide. An end structure of these carboxylic acid polyesters is not particular limited, and may be a hydroxyl group, a carboxyl group, or a group with an ester bond obtained by a reaction of an end hydroxyl group or an end carboxyl group with a monovalent carboxylic acid or a monohydric alcohol.

Examples of the carbonic acid polyester-based plasticizer include a carbonic acid polyester obtained by alternating copolymerization of a transesterification reaction of a polyhydric alcohol such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl) cyclohexane, 1,3-bis(hydroxymethyl) cyclohexane and 1,4-bis(hydroxymethyl) cyclohexane with a carbonic acid ester such as dimethyl carbonate and diethyl carbonate. An end structure of these carbonic acid polyester compounds is not particularly limited, and may be preferably a carbonic acid ester group or a hydroxyl group.

Examples of the polyalkylene glycol-based plasticizer include a polymer obtained by ring-opening polymerization of an alkyleneoxide such as ethylene oxide, propylene oxide, butylene oxide and oxetane using a monohydric alcohol, a polyhydric alcohol, a monovalent carboxylic acid or a polyvalent carboxylic acid as an initiator.

Examples of the hydroxycarboxylic acid ester-based plasticizer include a monohydric alcohol ester of a hydroxycarboxylic acid such as methyl ricinoleate, ethyl ricinoleate, butyl ricinoleate, methyl 6-hydroxyhexanoate, ethyl 6-hydroxyhexanoate and butyl 6-hydroxyhexanoate; a polyhydric alcohol ester of a hydroxycarboxylic acid such as ethylene glycol di(6-hydroxyhexanoic acid) ester, diethylene glycol di(6-hydroxyhexanoic acid) ester, triethylene glycol di(6-hydroxyhexanoic acid) ester, 3-methyl-1,5-pentanediol di(6-hydroxyhexanoic acid) ester, 3-methyl-1,5-pentanediol di(2-hydroxybutyric acid) ester, 3-methyl-1,5-pentanediol di(3-hydroxybutyric acid) ester, 3-methyl-1,5-pentanediol di (4-hydroxybutyric acid) ester, triethylene glycol di(2-hydroxybutyric acid) ester, glycerin tri(ricinoleic acid) ester, L-tartaric acid di(1-(2-ethylhexyl)) and castor oil; and a compound obtained by substituting k of a hydroxycarboxylic acid-derived group in a polyhydric alcohol ester of a hydroxycarboxylic acid (in which k is a natural number, and a number equal to or less than a number of a hydroxyl group in the polyhydric alcohol ester of the hydroxycarboxylic acid) with a carboxylic acid-derived group not having a hydroxyl group or with a hydrogen atom. As these hydroxycarboxylic acid esters, the esters obtained by a conventional well-known method can be used.

In the present invention, these plasticizers may be used alone, or may be used in combination of two or more.

The content of the plasticizer is preferably 100 parts by weight or less, more preferably 80 parts by weight or less, even more preferably 75 parts by weight or less and especially preferably 70 parts by weight or less, based on 100 parts by weight of the polyvinyl acetal resin. When the content of the plasticizer is 100 parts by weight or less, based on 100 parts by weight of the polyvinyl acetal resin, a laminated glass obtained by use of the resulting intermediate film for laminated glass (2) tends to have excellent impact resistance.

In a case where the A layer and the B layer comprise the plasticizer, the content of the plasticizer in the A layer may be the same as or different from that in the B layer. For example, the A layer may comprise the plasticizer in an amount of 50 parts by weight or more, based on 100 parts by weight of the polyvinyl acetal resin, whereas the B layer may comprise the plasticizer in an amount of 10 parts by weight or more and less than 50 parts by weight, based on 100 parts by weight of the polyvinyl acetal resin.

(Ionomer Resin)

In the present invention, an ionomer resin is not particularly limited. Examples of the ionomer resin include a resin having an ethylene-derived monomer unit and an α,β-unsaturated carboxylic acid-derived monomer unit, in which at least part of the α,β-unsaturated carboxylic acid is neutralized with a metal ion. Examples of the metal ion include a sodium ion. In the ethylene α,β-unsaturated carboxylic acid copolymer which is a base polymer, the content of the α,β-unsaturated carboxylic acid-derived monomer unit is preferably 2% by mass or more, more preferably 5% by mass or more. Also, the content of the α,β-unsaturated carboxylic acid-derived monomer unit is preferably 30% by mass or less, more preferably 20% by mass or less. In the present invention, from the viewpoint of availability, an ethylene-based ionomer such as an ionomer of ethylene-acrylic acid copolymer and an ionomer of ethylene-methacrylic acid copolymer is preferable. As the ethylene-based ionomer, a sodium ionomer of an ethylene-acrylic acid copolymer and a sodium ionomer of an ethylene-methacrylic acid copolymer are especially preferable. The ionomer resin may be used alone, or may be used in combination of two or more.

(Thermoplastic Elastomer)

In the present specification, a thermoplastic elastomer means a polymer compound softening and exhibiting plasticity when heated and solidifying and exhibiting rubber elasticity when cooled. Examples of the thermoplastic elastomer include a polymer compound with a hard segment and a soft segment as described below. In addition, rubber such as natural rubber, isoprene rubber, butadiene rubber, chloroprene rubber, nitrile rubber, butyl rubber, ethylenepropylene rubber, urethane rubber, silicone rubber, chlorosulfonated polyethylene rubber, acrylic rubber and fluorine rubber may be used.

As the above thermoplastic elastomer, the polymer compound with the hard segment and the soft segment is preferably used. Examples of such a polymer compound include a polystyrene-based elastomer (soft segment; polybutadiene, polyisoprene or the like/hard segment; polystyrene), a polyolefine-based elastomer (soft segment; ethylenepropylene rubber/hard segment; polypropylene), a polyvinyl chloride-based elastomer (soft segment; polyvinyl chloride/hard segment; polyvinyl chloride), a polyurethane-based elastomer (soft segment; polyether, polyester/hard segment; polyurethane), a polyester-based elastomer (soft segment; polyether/hard segment; polyester), a polyamide-based elastomer (soft segment; polyester diol, polyether diol/hard segment; polyamide <nylon resin>), a polybutadiene-based elastomer (soft segment; amorphous butyl rubber/hard segment; syndiotactic 1,2-polybutadiene), an acryl-based elastomer (soft segment; polyacrylic acid ester/hard segment; polymethyl methacrylate). These thermoplastic elastomers may be used alone, or may be used in combination of two or more.

A content of the hard segment in the above thermoplastic elastomer is preferably 4% by mass or more, more preferably 6% by mass or more, even more preferably 8% by mass or more, especially preferably 10% by mass or more, based on the total amount of the thermoplastic elastomer. The content of the hard segment is preferably 30% by mass or less, more preferably 27% by mass or less, even more preferably 25% by mass or less, especially preferably 23% by mass or less, based on the total amount of the thermoplastic elastomer. When the content of the hard segment is 4% by mass or more, formability becomes better. When the content of the hard segment is 30% by mass or less, appropriate toughness can be imparted and impact resistance of a laminated glass obtained by use of the resulting intermediate film for laminated glass (2) can be improved.

A content of the soft segment in the above thermoplastic elastomer is preferably 70% by mass or more, more preferably 73% by mass or more, even more preferably 75% by mass or more, especially preferably 77% by mass or more, based on the total amount of the thermoplastic elastomer. The content of the soft segment is preferably 96% by mass or less, more preferably 94% by mass or less, even more preferably 92% by mass or less, especially preferably 90% by mass or less, based on the total amount of the thermoplastic elastomer. When the content of the soft segment is 70% by mass or more, appropriate toughness can be imparted and impact resistance of a laminated glass obtained by use of the resulting intermediate film can be improved. When the content of the soft segment is 96% by mass or less, formability becomes better.

As the above thermoplastic elastomer, from the viewpoint of achieving both formability and impact resistance of a laminated glass, a block copolymer having an aromatic vinyl polymer block and an aliphatic unsaturated hydrocarbon polymer block (hereinafter may be referred to as "block copolymer (A)") is preferable, a block copolymer having an aromatic vinyl polymer block and a vinyl polymer block or a conjugated diene polymer block is more preferable, and a block copolymer having a polystyrene block and a vinyl polymer block or a conjugated diene polymer block is especially preferable.

In a case where the copolymer having the aromatic vinyl polymer block and the vinyl polymer block or the conjugated diene polymer block, for example, the block copolymer (A) is used as the thermoplastic elastomer, a bonding form of these polymer blocks is not particularly limited, and may be linear, branched, radial, or a bonding form combining two or more of those. It is preferably linear.

Examples of the copolymer with linear bonding form include a diblock copolymer represented by a-b, a triblock copolymer represented by a-b-a or b-a-b, a tetrablock copolymer represented by a-b-a-b, a pentablock copolymer represented by a-b-a-b-a or b-a-b-a-b, an $(a-b)_n$X-type copolymer (wherein X means a coupling residue, and n is an integer of 2 or more), and a mixture thereof, when the aromatic vinyl polymer block is represented by a and the vinyl polymer block or the conjugated diene polymer block is represented by b. Among them, the diblock copolymer or the triblock copolymer is preferable. As the triblock copolymer, the triblock copolymer represented by a-b-a is more preferable.

A total amount of the aromatic vinyl-derived monomer unit and the aliphatic unsaturated hydrocarbon-derived monomer unit in the block copolymer (A) is preferably 80% by mass or more, more preferably 90% by mass or more, even more preferably 95% by mass or more, especially preferably 98% by mass or more, and may be 100% by mass, based on all monomer units constituting the block copolymer (A). The aliphatic unsaturated hydrocarbon polymer block in the above block copolymer (A) may be partly or completely hydrogenated.

A content of the aromatic vinyl-derived monomer unit in the block copolymer (A) is preferably 4% by mass or more, more preferably 6% by mass or more, even more preferably 8% by mass or more, especially preferably 10% by mass or more, based on all monomer units of the block copolymer (A). The content of the aromatic vinyl-derived monomer unit is preferably 30% by mass or less, more preferably 27% by mass or less, even more preferably 25% by mass or less, especially preferably 23% by mass or less, based on all monomer units of the block copolymer (A). When the content of the aromatic vinyl-derived monomer unit in the block copolymer (A) is 4% by mass or more, good formability can be ensured. When the content of the aromatic vinyl-derived monomer unit in the block copolymer (A) is 30% by mass or less, appropriate toughness can be imparted and impact resistance of a laminated glass obtained by use of the resulting intermediate film for laminated glass (2) can be improved. The content of the aromatic vinyl-derived monomer unit in the block copolymer (A) can be obtained from addition ratio of each monomer when synthesizing the block copolymer (A) or from a measurement result of the block copolymer by a method such as $^1$H-NMR.

A content of the aromatic vinyl-derived monomer unit contained in the aromatic vinyl polymer block of the block copolymer (A) is preferably 80% by mass or more, more preferably 90% by mass or more, even more preferably 95% by mass or more, especially preferably 98% by mass or more, and may be 100% by mass, based on all monomer units in the aromatic vinyl polymer block.

Examples of the aromatic vinyl-derived monomer unit constituting the above aromatic vinyl polymer block include a monomer unit derived from styrene; an alkylstyrene such as α-methylstyrene, 2-methylstyrene, 3-methylstyrene, 4-methylstyrene, 4-propylstyrene, 4-cyclohexylstyrene and 4-dodecylstyrene; an aryl styrene such as 2-ethyl-4-benzylstyrene, 4-(phenylbutyl)styrene, 1-vinylnaphthalene and 2-vinylnaphthalene; a halogenated styrene; an alkoxy styrene; vinyl benzoate. These may be used alone, or may be used in combination of two or more.

The above aromatic vinyl polymer block may comprise a monomer unit derived from a compound other than the aromatic vinyl. Examples of the monomer unit derived from the compound other than the aromatic vinyl include a unit of a unsaturated monomer such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinyl cyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, norbornene and acetylene; a unit of a (meth)acrylate-based monomer such as methyl acrylate and methyl methacrylate; and a monomer unit derived from a conjugated diene such as butadiene, 1,3-pentadiene, 1,3-hexadiene, isoprene, cyclopentadiene, 1,3-cyclohexadiene, 1,3-octadiene and 1,3-cyclooctadiene. A content of the monomer unit derived from the compound other than the aromatic vinyl is preferably 20% by mass or less, more preferably 10% by mass or less, even more preferably 5% by mass or less, especially preferably 2% by mass or less, and may be 0% by mass, based on all monomer units in the aromatic vinyl polymer block.

A content of the aliphatic unsaturated hydrocarbon-derived monomer unit in the block copolymer (A) is preferably 70% by mass or more, more preferably 73% by mass or more, even more preferably 75% by mass or more, especially preferably 77% by mass or more, based on all monomer units in the block copolymer (A). A content of the aliphatic unsaturated hydrocarbon-derived monomer unit in the block copolymer (A) is preferably 96% by mass or less, more preferably 94% by mass or less, even more preferably 92% by mass or less, especially preferably 90% by mass or less, based on all monomer units in the block copolymer (A). When the content of the aliphatic unsaturated hydrocarbon-derived monomer unit in the block copolymer (A) is 70% by mass or more, impact resistance of a laminated glass obtained by use of the resulting intermediate film for laminated glass (2) can be improved. When the content of the aliphatic unsaturated hydrocarbon-derived monomer unit in the block copolymer (A) is 96% by mass or less, good formability can be ensured. The content of the aliphatic unsaturated hydrocarbon-derived monomer unit in the block copolymer (A) can be obtained from addition ratio of each monomer when synthesizing the block copolymer or from a measurement result of the block copolymer by a method such as $^1$H-NMR.

A content of the aliphatic unsaturated hydrocarbon-derived monomer unit in the aliphatic unsaturated hydrocarbon polymer block of the block copolymer (A) is preferably 80% by mass or more, more preferably 90% by mass or more, even more preferably 95% by mass or more, especially preferably 98% by mass or more, and may be 100% by mass, based on all monomer unit in the aliphatic unsaturated hydrocarbon polymer block.

Examples of the aliphatic unsaturated hydrocarbon-derived monomer unit constituting the above aliphatic unsaturated hydrocarbon polymer block include a monomer unit derived from a vinyl compound such as ethylene, propylene, 1-butene, 1-pentene, 1-hexene, 1-heptene, 1-octene, 1-nonene, 1-decene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3, 4-dimethyl-1-pentene, 4,4-dimethyl-1-pentene and vinyl cyclohexane; a diene compound such as butadiene, isoprene and dicyclopentadiene; norbornene and acetylene. The above aliphatic unsaturated hydrocarbon-derived monomer unit may be a monomer unit derived from an aliphatic unsaturated hydrocarbon in which part of carbon atoms or hydrogen atoms are substituted with hetero atoms, such as hexafluoropropene, tetrafluoroethylene, 2-fluoropropene, fluoroethylene, 1,1-difluoroethylene, 3-fluoropropene, trifluoroethylene and 3,4-dichloro-1-butene; and a monomer unit derived from an aliphatic unsaturated hydrocarbon in which an aromatic group bonds to a carbon atom other than carbon atoms constituting a vinyl group, such as 4-phenyl-1-butene and 6-phenyl-1-hexene. These may be used alone, or may be used in combination of two or more.

A carbon number of the above aliphatic unsaturated hydrocarbon-derived monomer unit is preferably 2 or more, more preferably 4 or more and preferably 12 or less, more preferably 8 or less, from the viewpoints of availability and handling. The above aliphatic unsaturated hydrocarbon-derived monomer unit is preferably a conjugated diene-derived monomer unit from the viewpoints of availability, handling, and ease of synthesis. That is, as the above aliphatic unsaturated hydrocarbon, it is more preferable to use butadiene, isoprene or combination of butadiene and isoprene.

A content of the conjugated diene-derived monomer unit in the above aliphatic unsaturated hydrocarbon polymer block is preferably 80% by mass or more, more preferably 90% by mass or more, even more preferably 95% by mass or more, especially preferably 98% by mass or more, and may be 100% by mass. From the viewpoint of improving thermal stability, in a case where a conjugated diene-derived monomer is used for a monomer unit constituting the above aliphatic unsaturated hydrocarbon polymer block, the conjugated diene-derived monomer is preferably partially or completely hydrogenated. A hydrogenation rate in this case is preferably 60 mol % or more, more preferably 70 mol % or more, even more preferably 75 mol % or more, particularly preferably 80 mol % or more. The hydrogenation rate is a value obtained by measuring iodine numbers of the block copolymer before and after the hydrogenation reaction. The hydrogenation rate can be adjusted by changing a hydrogen pressure or a reaction temperature in the hydrogenation reaction.

A conjugated diene in the above aliphatic unsaturated hydrocarbon polymer block may have bonding in multiple bonding forms. As the bonding forms, there are 1,4-bonding, 1,2-bonding and 3,4-bonding regarding an isoprene unit, and there are 1,4-bonding and 1,2-bonding regarding a butadiene unit. A total amount of the content of 1,2-bonding and 3,4-bonding of the isoprene unit and a content of 1,2-bonding of the butadiene unit is preferably 20 mol % or more, more preferably 30 mol % or more, even more preferably 40 mol % or more, based on a total amount of the conjugated diene-derived monomer unit in the above aliphatic unsaturated hydrocarbon polymer block (for example, based on a total amount of the isoprene unit and the butadiene unit). The above total amount is preferably 100 mol % or less, more preferably 95 mol % or less, even more preferably 90 mol % or less. In a case where the isoprene unit is contained in the above aliphatic unsaturated hydrocarbon polymer block, the above total amount is especially preferably 85 mol % or less, most preferably 75 mol % or less.

In a case where the conjugated diene-derived monomer unit is contained in the above aliphatic unsaturated hydrocarbon polymer block and the isoprene unit is contained in an amount of 90 mol % or more based on the conjugated diene-derived monomer unit, it is preferable that a monomer unit derived from a monomer other than the conjugated diene is not contained and a total amount of the contents of 1,2-bonding and 3,4-bonding of the isoprene unit is preferably 30 mol % or more, more preferably 40 mol % or more, based on a total amount of the conjugated diene-derived monomer unit in the above aliphatic unsaturated hydrocarbon polymer block. In addition, the above total amount is preferably 75 mol % or less, more preferably 60 mol % or less.

In a case where the conjugated diene-derived monomer unit is contained in the above aliphatic unsaturated hydrocarbon polymer block and the butadiene unit is contained in an amount of 90 mol % or more based on the conjugated diene-derived monomer unit, a content of 1,2-bonding of the butadiene unit is preferably 20 mol % or more, more preferably 65 mol % or more, even more preferably 80 mol % or more, based on a total amount of the conjugated diene-derived monomer unit in the above aliphatic unsaturated hydrocarbon polymer block. The above content is preferably 100 mol % or less.

In a case where the conjugated diene-derived monomer unit is contained in the above aliphatic unsaturated hydrocarbon polymer block, where a total content of the isoprene unit and the butadiene unit is 90 mol % or more based on the conjugated diene-derived monomer unit, and where weight ratio of the isoprene unit and the butadiene unit (the isoprene unit/the butadiene unit) is 10/90 to 90/10, a total amount of the contents of 1,2-bonding and 3,4-bonding of the isoprene unit and the butadiene unit is preferably 20 mol % or more, more preferably 40 mol % or more, even more preferably 50 mol % or more, based on a total amount of the conjugated diene-derived monomer unit in the above aliphatic unsaturated hydrocarbon polymer block. The above total amount is preferably 95 mol % or less, more preferably 85 mol % or less.

A monomer unit derived from a monomer other than the aliphatic unsaturated hydrocarbon may be copolymerized in the aliphatic unsaturated hydrocarbon polymer block, when the amount of the monomer unit is small. Examples of the monomer unit derived from the monomer other than the aliphatic unsaturated hydrocarbon include the monomer unit exemplified as the "examples of the monomer unit derived from the compound other than the aromatic vinyl". A content of the monomer unit derived from the monomer other than the aliphatic unsaturated hydrocarbon is preferably 20% by mass or less, more preferably 10% by mass or less, even more preferably 5% by mass or less, especially preferably 2% by mass or less, and may be 0% by mass, based on the all monomer units in the aliphatic unsaturated hydrocarbon polymer block.

A weight-average molecular weight of the block copolymer (A) is preferably 30,000 or more, more preferably 50,000 or more from the viewpoints of mechanical properties and forming processability of the block copolymer (A). The weight-average molecular weight of the block copolymer (A) is preferably 400,000 or less, more preferably 300,000 or less from the viewpoints of mechanical properties and forming processability of the block copolymer (A). A ratio of weight-average molecular weight and number-average molecular weight ($M_w/M_n$) of the block copolymer (A) is preferably 1.0 or more. The ratio of weight-average molecular weight and number-average molecular weight ($M_w/M_n$) of the block copolymer (A) is preferably 2.0 or less, more preferably 1.5 or less. The weight-average molecular weight means a weight-average molecular weight obtained by the gel permeation chromatography (GPC) measurement relative to polystyrene standards, and the number-average molecular weight means a number-average molecular weight obtained by the GPC measurement relative to polystyrene standards.

A method for producing the block copolymer (A) is not particularly limited. The block copolymer (A) can be produced by any method well-known in the art such as the anion polymerization method, the cation polymerization method, the radical polymerization method and other methods. Concrete examples of the anion polymerization method include the following methods (i) to (iii):

(i) a method in which an alkyllithium compound is used as an initiator, and an aromatic vinyl monomer, a conjugated diene monomer and then an aromatic vinyl monomer are successively polymerized;

(ii) a method in which an alkyllithium compound is used as an initiator, and an aromatic vinyl monomer and a conjugated diene monomer are successively polymerized, and then a coupling agent is added to perform coupling;

(iii) a method in which a dilithium compound is used as an initiator, and a conjugated diene monomer and an aromatic vinyl monomer are successively polymerized.

In a case where the conjugated diene is used as the aliphatic unsaturated hydrocarbon monomer, an amount of 1,2-bonding and an amount of 3,4-bonding in the block copolymer (A) can be increased by adding an organic Lewis base when an anion polymerization is performed, and the amount of 1,2-bonding and an amount of 3,4-bonding in the block copolymer (A) can be easily adjusted by the amount of the organic Lewis base added.

Examples of the above organic Lewis base include an ester such as ethyl acetate; an amine such as triethylamine, N, N, N', N'-tetramethylethylenediamine (TMEDA) and N-methylmorpholine; a nitrogen-containing aromatic heterocyclic compound such as pyridine; an amide such as dimethylacetamide; an ether such as dimethyl ether, diethyl ether, tetrahydrofuran (THF) and dioxane; a glycol ether such as ethylene glycol dimethyl ether and diethylene glycol dimethyl ether; a sulfoxide such as dimethyl sulfoxide; a ketone such as acetone and methyl ethyl ketone.

In a case where a unhydrogenated thermoplastic elastomer, for example, a polystyrene-based elastomer is subjected to a hydrogenation reaction, the hydrogenation reaction can be performed by dissolving the resulting unhydrogenated polystyrene-based elastomer in a solvent inert to a hydrogenation catalyst or using the unhydrogenated polystyrene-based elastomer without isolating the unhydrogenated polystyrene-based elastomer from a reaction solution, and then reacting the unhydrogenated polystyrene-based elastomer with hydrogen in the presence of the hydrogenation catalyst.

Examples of the hydrogenation catalyst include Raney nickel; a heterogeneous catalyst in which a metal such as Pt, Pd, Ru, Rh or Ni is supported on a carrier such as carbon, alumina and diatomaceous earth; Ziegler catalyst comprising a combination of a transition metal compound and an alkylaluminum compound, an alkyllithium compound or the like; a metallocene-based catalyst. The hydrogenation reaction can be usually performed under conditions of a hydrogen pressure of 0.1 MPa or more and 20 MPa or less, a reaction temperature of 20° C. or more and 250° C. or less and a reaction time of 0.1 hour or more and 100 hours or less.

(Other Additive Components)

To the A layer and/or the B layer, as other additive components, an antioxidant, an ultraviolet absorber, a light stabilizer, an adhesive strength modifier, a thermal barrier material, a blocking inhibitor, a pigment, a dye, a functional inorganic compound and other additive components may be added as necessary.

(Antioxidant)

Examples of the antioxidant include a phenolic-based compound, a phosphorus-based compound and a sulfur-based compound. Among them, a phenolic-based compound is preferable, and an alkyl-substituted phenolic-based compound is more preferable.

Examples of the phenolic-based compound include an acrylate-based compound such as 2-t-butyl-6-(3-t-butyl-2-hydroxy-5-methylbenzyl)-4-methylphenyl acrylate, and 2,4-di-t-amyl-6-(1-(3,5-di-t-amyl-2-hydroxyphenyl)ethyl)phenyl acrylate; an alkyl-substituted phenolic-based compound such as 2,6-di-t-butyl-4-methylphenol, 2,6-di-t-butyl-4-ethylphenol, octadecyl-3-(3,5-)di-t-butyl-4-hydroxyphenyl) propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tris(2-methyl-4-hydroxy-5-t-butylphenyl)butane, 1,3,5-tris(4-tert-butyl-3-hydroxy-2,6-dimethylbenzyl)-1,3,5-triazine-2,4,6-(1H,3H,5H)-trione, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane, and triethylene glycol bis(3-(3-t-butyl-4-hydroxy-5-methylphenyl)propionate); and a triazine group-containing phenolic-based compound such as 1,3,5-tris(2,6-dimethyl-3-hydroxy-4-t-butylbenzyl)-1,3,5-triazine-2,4,6(1H,3H,5H)-trione, 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine, and 2-octylthio-4,6-bis-(3,5-di-t-butyl-4-oxyanilino)-1,3,5-triazine.

Examples of the phosphorus-based compound include a monophosphite-based compound such as triphenyl phosphite, diphenyl isodecyl phosphite, phenyl diisodecyl phosphite, tris(nonylphenyl)phosphite, tris(dinonylphenyl)phosphite, tris(2-t-butyl-4-methylphenyl)phosphite, tris(2,4-di-t-butyl)phosphite, tris(cyclohexylphenyl)phosphite, tris(2,4-di-t-butylphenyl)phosphate, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene; and a diphosphite-based compound such as 4,4'-butylidene-bis(3-methyl-6-t-butylphenyl-di-tridecyl phosphite), 4,4'-isopropylidene-bis(phenyl-di-alkyl(C12-C15)phosphite), 4,4'-isopropylidene-bis(diphenylmonoalkyl(C12-C15)phosphite), 1,1,3-tris(2-methyl-4-di-tridecylphosphite-5-t-butylphenyl)butane, and tetrakis(2,4-di-t-butylphenyl)-4,4'-biphenylene phosphite. Among them, the monophosphite-based compound is preferable.

Examples of the sulfur-based compound include dilauryl 3,3'-thiodipropionate, distearyl 3,3-thiodipropionate, lauryl stearyl 3,3'-thiodipropionate, pentaerythritol-tetrakis-(β-lauryl-thiopropionate), and 3,9-bis (2-dodecylthioethyl)-2,4,8,10-tetraoxaspiro[5.5]undecane.

These antioxidants can be used alone or in combination of two or more. The amount of the antioxidant added is preferably 0.001 part by weight or more, more preferably 0.01 part by weight or more with respect to 100 parts by weight of the total amount of all components forming the layers constituting the intermediate film for laminated glass (1). The amount of the antioxidant added is preferably 10 parts by weight or less, preferably 1 part by weight or less with respect to 100 parts by weight of the total amount of all components forming the layers constituting the intermediate film for laminated glass (1). When the amount of the antioxidant added is from one of the above lower limits to one of the above upper limits, a sufficient antioxidant effect can be exhibited.

(Ultraviolet Absorber)

Examples of the ultraviolet absorber include a benzotriazole-based compound and a benzoate-based compound. These ultraviolet absorbers may be used alone, or may be used in combination of two or more.

Examples of the benzotriazole-based compound include 2-(5-methyl-2-hydroxyphenyl)benzotriazole, 2-[2-hydroxy-3,5-bis(α, α'-dimethylbenzyl)phenyl]-2H-benzotriazole, 2-(3,5-di-t-butyl-2-hydroxyphenyl)benzotriazole, 2-(5-chloro-2-benzotriazolyl)-6-tert-butyl-p-cresol, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl) benzotriazole, and 2-(2'-hydroxy-5'-t-octylphenyl) benzotriazole.

Examples of the benzoate-based compound include 2,4-di-t-butylphenyl-3,5-di-t-butyl-4-hydroxybenzoate and hexadecyl-3,5-di-t-butyl-4-hydroxybenzoate.

These ultraviolet absorbers may be used alone, or may be used in combination of two or more. The amount of the ultraviolet absorber added is preferably 0.001 part by or more, more preferably 0.005 part by weight or more, even more preferably 0.01 part by weight or more, with respect to 100 parts by weight of the total amount of all components forming the layers constituting the intermediate film for laminated glass (1). The amount of the ultraviolet absorber added is preferably 10 parts by weight or less, more preferably 5 parts by weight or less, even more preferably 1 part by weight or less, with respect to 100 parts by weight of the total amount of all components forming the layers constituting the intermediate film for laminated glass (1). When the amount of the ultraviolet absorber added is from one of the above lower limits to one of the above upper limits, a sufficient ultraviolet absorption effect can be exhibited.

(Light Stabilizer)

A light stabilizer is preferably a hindered amine-based compound. Examples of the hindered amine-based compound include ADEKA STAB LA-57 (trade name) manufactured by ADEKA Corporation and TINUVIN 622 (trade name) manufactured by Ciba Specialty Chemicals Inc.

These light stabilizers may be used alone, or may be used in combination of two or more. The amount of the light stabilizer added is preferably 0.001 part by weight or more, more preferably 0.005 part by weight or more, even more preferably 0.01 part by weight or more, with respect to 100 parts by weight of the total amount of all components forming the layers constituting the intermediate film for laminated glass (1). The amount of the light stabilizer added is preferably 10 parts by weight or less, more preferably 5 parts by weight or less, even more preferably 1 part by weight or less, with respect to 100 parts by weight of the total amount of all components forming the layers constituting the intermediate film for laminated glass (1). When the amount of the light stabilizer added is from one of the above lower limits to one of the above upper limits, a sufficient light stabilization effect can be exhibited.

(Adhesive Strength Modifier)

In order to adjust an adhesive strength to a glass, an adhesive strength modifier may be added to a layer in contact with the glass when a laminated glass is produced. As the adhesive strength modifier, conventionally known adhesive strength modifiers can be used. For example, a sodium, potassium or magnesium salt of an organic acid such as acetic acid, propionic acid, butanoic acid, hexanoic acid, 2-ethylbutanoic acid, 2-ethylhexanoic acid, heptanoic acid, octylic acid, nonanoic acid, decanoic acid, neodecanoic acid and lauric acid, and a silane coupling agent can be used. These adhesive strength modifiers may be used alone, or may be used in combination of two or more. The amount of the adhesive strength modifier added may be appropriately determined according to the type of the adhesive strength modifier used. Usually, it is preferable to adjust the adhesive strength of the intermediate film for laminated glass (1) to a glass to 3 to 10 in the Pummel test (Pummel test; described in WO 03/033583 A). Especially, in a case where high penetration resistance is required for a laminated glass, it is preferable to adjust a content of the adhesive strength modifier so as to obtain the above adhesive strength of 3 to 6, and in a case where high glass scattering prevention is required for a laminated glass, it is preferable to adjust a content of the adhesive strength modifier so as to obtain the above adhesive strength of 7 to 10. In a case where high glass scattering prevention is required for a laminated glass, it is also useful not to add any adhesive strength modifier. Usually, a content of the adhesive strength modifier in a layer in contact with the glass when a laminated glass is produced is preferably 0.0001 to 1% by weight, more preferably 0.0005 to 0.1% by weight, even more preferably 0.001 to 0.03% by weight, with respect to the total weight of all components forming the layer.

In order to adjust an adhesive strength between the A layer and the B layer which are adjacent in the intermediate film for laminated glass (1), an adhesive strength modifier may be added to the A layer or the B layer. Examples of such an adhesive strength modifier used for adjusting the adhesive strength between the adjacent layers include polyolefines with an adhesive functional group such as a carboxyl group, a derivative group of a carboxyl group, an epoxy group, a boronic acid group, a derivative group of a boronic acid group, an alkoxyl group or a derivative group of an alkoxyl group.

(Thermal Barrier Material)

When the A layer and/or the B layer contain a thermal barrier material (for example, inorganic thermal barrier fine particles or organic thermal barrier materials which have an infrared absorption ability), a thermal barrier function can be imparted to the intermediate film for laminated glass (1) and a transmittance of near infrared light can be reduced when producing a laminated glass. Examples of the inorganic thermal barrier fine particle include tin-doped indium oxide (ITO), antimony-doped tin oxide (ATO), aluminum-doped zinc oxide (AZO), zinc antimonate ($ZnSb_2O_5$), lanthanum hexaboride, and metal-doped tungsten oxide represented by the general formula $M_mWO_n$ (wherein M represents a metal element, m is a number of 0.01 or more and 1.0 or less, and n is a number of 2.2 or more and 3.0 or less). Among them, ITO, ATO and metal-doped tungsten oxide are preferable. Examples of the metal element represented as M in the general formula of the metal-doped tungsten oxide include Cs, Tl, Rb, Na and K, and Cs is particularly preferable. From the viewpoint of a thermal barrier property, m in the general formula is preferably 0.2 or more, more preferably 0.3 or more, and preferably 0.5 or less, more preferably 0.4 or less.

In a case where the intermediate film for laminated glass (1) of the present invention contains the inorganic thermal barrier fine particles, the content is preferably 0.01 part by weight or more, more preferably 0.05% by mass or more, even more preferably 0.1% by mass or more, especially preferably 0.2% by mass or more, with respect to 100 parts by weight of the total amount of all components forming the layers constituting the intermediate film for laminated glass (1). The content is preferably 5% by mass or less, more preferably 3% by mass or less. When the content of the inorganic thermal barrier fine particles is from one of the above lower limits to one of the above upper limits, in a laminated glass obtained by use of the resulting intermediate film for laminated glass (2), the transmittance of near infrared light can be effectively reduced and high visible light transmittance can be maintained. An average particle size of the inorganic thermal barrier fine particles is preferably 100 nm or less. An average particle size of 50 nm or less is more preferable from the viewpoint of transparency. The average particle size of the inorganic thermal barrier fine particles means that measured with a laser diffractometer.

Examples of the organic thermal barrier material include a phthalocyanine compound and a naphthalocyanine compound. The organic thermal barrier material preferably contains a metal from the viewpoint of further improving heat insulation. Examples of the metal include Na, K, Li, Cu, Zn, Fe, Co, Ni, Ru, Rh, Pd, Pt, Mn, Sn, V, Ca and Al, and Ni is particularly preferable.

The content of the organic thermal barrier materials is preferably 0.001% by mass or more, more preferably 0.005% by mass or more, even more preferably 0.01% by mass or more, with respect to the total amount of all components forming the layers constituting the intermediate film for laminated glass (1). The content is preferably 1% by mass or less, more preferably 0.5% by mass or less. When the content of the organic thermal barrier materials is from one of the above lower limits to one of the above upper limits, the transmittance of near infrared light of a laminated glass obtained by use of the resulting intermediate film for laminated glass (2) can be effectively reduced.

These thermal barrier materials may be used alone, or may be used in combination of two or more.

A film thickness of the intermediate film for laminated glass (1) is preferably 0.05 mm or more, more preferably 0.1 mm or more, even more preferably 0.3 mm or more. The film thickness of the intermediate film for laminated glass (1) is preferably 10 mm or less, more preferably 5 mm or less, even more preferably 3 mm or less. When the film thickness of the intermediate film for laminated glass (1) is from one of the above lower limits to one of the above upper limits, it is preferable since lamination is easy when producing a laminated glass and costs are reduced.

A film thickness of the A layer in the intermediate film for laminated glass (1) is preferably 0.01 mm or more, more preferably 0.05 mm or more, even more preferably 0.1 mm or more. The film thickness of the A layer is preferably 3 mm or less, more preferably 2 mm or less, even more preferably 1 mm or less. When the film thickness of the A layer is from one of the above lower limits to one of the above upper limits, it is preferable since lamination is easy when producing a laminated glass and costs are reduced. In a case where the intermediate film for laminated glass (1) comprises multiple A layers, a total thickness of the A layers is preferably from one of the above lower limits to one of the above upper limits. In addition, a thickness of at least one single layer of the A layers is preferably 0.01 mm or more and 0.7 mm or less, more preferably 0.10 mm or more and 0.40 mm or less.

A film thickness of the B layer in the intermediate film for laminated glass (1) is preferably 0.04 mm or more, more preferably 0.1 mm or more, even more preferably 0.2 mm or more. The film thickness of the B layer is preferably 7 mm or less, more preferably 5 mm or less, even more preferably 3 mm or less. When the film thickness of the B layer is from one of the above lower limits to one of the above upper limits, it is preferable since lamination is easy when producing a laminated glass and costs are reduced. In a case where the intermediate film for laminated glass (1) comprises multiple B layers, a total thickness of the B layers is preferably from one of the above lower limits to one of the above upper limits. In addition, a thickness of at least one single layer of the B layers is preferably 0.04 mm or more and 1.0 mm or less, more preferably 0.10 mm or more and 0.40 mm or less.

The intermediate film for laminated glass (1) may comprise the C layer as described above. The C layer may be a layer comprising a well-known resin. Examples of such a resin contained in the C layer include polyethylene, polypropylene, polyvinyl chloride, polystyrene, polyvinyl acetate, polyurethane, polytetrafluoroethylene, an acrylic resin, polyamide, polyacetal, polycarbonate, polyester such as polyethylene terephthalate and polybutylene terephthalate, cyclic polyolefine, polyphenylene sulfide, polytetrafluoroethylene, polysulfone, polyethersulfone, polyarylate, a liquid crystal polymer and polyimide. If necessary, the C layer may comprise a plasticizer, an antioxidant, an ultraviolet absorber, a light stabilizer, an adhesive strength modifier, a thermal barrier material, a blocking inhibitor, a pigment, a dye, a functional inorganic compound and other additives. Examples of these additives include the same materials as the additive components which may be used for the A layer and/or the B layer.

The method for producing the intermediate film for laminated glass (1) is not particularly limited. For example, the A layer can be produced by uniformly kneading a composition obtained by mixing all components constituting the A layer such as a polyvinyl acetal resin or an ionomer resin or a thermoplastic elastomer and an ultraviolet absorber and other additive components, followed by performing a well-known film forming method such as an extrusion method, a calendar method, a press method, a casting method or an inflation method. The B layer may be produced in the same way as the A layer, and the produced A layer and the produced B layer may be laminated by a method such as press forming. Alternatively, the A layer, the B layer and other required layer may be formed by a coextrusion method.

Among the well-known film forming methods, a method for producing the intermediate film for laminated glass (1) by use of an extruder is preferably adopted. The temperature during extrusion (temperature of the composition) is preferably 150° C. or more, more preferably 170° C. or more. Further, the temperature during extrusion (temperature of the composition) is preferably 250° C. or less, more preferably 230° C. or less. When the temperature at the time of extrusion is from one of the above lower limits to one of the above upper limits, decomposition of the resin or other components contained in the composition is hard to occur and discharge from the extruder can be stabilized. In order to efficiently remove a volatile substance, it is preferable to remove the volatile substance from a vent port of the extruder by reducing the pressure.

It is also preferable to form uneven structure such as melt fracture and emboss on a surface of the intermediate film for laminated glass (1) by a well-known method. The shape of the melt fracture or emboss is not particularly limited, and a well-known shape can be adopted.

(Method for Recycling Intermediate Film for Laminated Glass)

The method for recycling the intermediate film for laminated glass of the present invention comprises a step of separating the layer comprising the A layer and the layer comprising the B layer from the intermediate film for laminated glass (1) by any one of the said methods. The layer comprising the A layer and/or the layer comprising the B layer which are separated may be recycled as an intermediate film for laminated glass as it is, or may be recycled as an intermediate film for laminated glass after processing it. In a preferable embodiment, the layer comprising the A layer and/or the layer comprising the B layer which are separated are used as at least part of raw materials to produce the intermediate film for laminated glass (2). In the production of the intermediate film for laminated glass (2), only the layer comprising the A layer may be used, only the layer comprising the B layer may be used, or both the layer comprising the A layer and the layer comprising the B layer may be used. More-specifically, for example, in a case where the intermediate film for laminated glass (1) has a three-layer structure of B layer/A layer/B layer, when producing the intermediate film for laminated glass (2) having a three-layer structure of b layer/a layer/b layer, the layer comprising the A layer may be used as a raw material for the a layer and a raw material other than the layer comprising the B layer (for example, a resin composition newly prepared) may be used as a raw material for the b layers, or the layer comprising the A layer may be used as a raw material for the a layer and the layer comprising the B layer may be used as a raw material for the b layer. Alternatively, the layer comprising the A layer or the layer comprising the B layer may be used to produce the intermediate film for laminated glass (2) having a single-layer structure. When producing the intermediate film for laminated glass (2), a raw material other than the layer comprising the A layer and the layer comprising the B layer may be further used. For example, when producing the intermediate film for laminated glass (2) having a three-layer structure of b layer/a layer/b layer, a mixture of a resin composition newly prepared as a raw material for the b layer and the layer comprising the B layer can be used, and a mixture of a resin composition newly prepared as a raw material for the a layer and the layer comprising the A layer can be used.

A method for using the layer comprising the A layer and/or the layer comprising the B layer which are separated from the intermediate film for laminated glass (1) as at least part of raw materials when producing the intermediate film for laminated glass (2) is not particularly limited. Examples of such a method include a method in which the layer comprising the A layer and/or the layer comprising the B layer are introduced into a T-die with a vent-type twin screw extruder, and a method in which the layer comprising the A layer and/or the layer comprising the B layer are introduced into a die with a vent-type twin screw extruder to obtain pellets, followed by introducing the pellets into a T-die with a vent-type single screw extruder. The method in which the layer comprising the A layer and/or the layer comprising the B layer are introduced into a T-die with a vent-type twin screw extruder is not particularly limited. Examples thereof include a method in which the layer comprising the A layer and/or the layer comprising the B layer are introduced into a T-die set at a temperature of 150 to 250° C. (more preferably 170 to 230° C.) under conditions of a temperature of 150 to 250° C. (more preferably 170 to 230° C.) and a discharge amount of 1 to 100000 kg/hour (more preferably 2 to 50000 kg/hour) by use of a vent-type twin screw extruder.

(Intermediate Film for Laminated Glass (2))

In the present invention, the intermediate film for laminated glass (2) can be produced by separating the layer comprising the A layer and the layer comprising the B layer from the intermediate film for laminated glass (1), and using the layer comprising the A layer and/or the layer comprising the B layer which are separated as raw materials. The present invention also relates to the intermediate film for laminated glass (2) thus obtained. In addition, the present invention also relates to a method for producing an intermediate film for laminated glass, comprising a step of separating the layer comprising the A layer and the layer comprising the B layer from the intermediate film for laminated glass (1) comprising at least the A layer and the B layer, wherein the layer comprising the A layer and/or the layer comprising the B layer which are separated are used as raw materials.

A layer structure of the intermediate film for laminated glass (2) is not particularly limited. The layer structure may be a single-layer structure, a two-layer structure of a layer/b layer, a three-layer structure of a layer/b layer/a layer, a multilayer structure with 4 or more layers, or a layer structure with a layer other than the a layer and the b layer (referred to as "c layer"). Examples of a resin constituting the c layer include the same resins as the examples of a resin constituting the C layer. The preferable embodiments of the intermediate film for laminated glass (2) except for the layer structure are the same as the preferable embodiments of the intermediate film for laminated glass (1).

(Recycle Rate of Intermediate Film for Laminated Glass)

A recycle rate of the intermediate film for laminated glass is represented by a ratio of the resin composition derived from the intermediate film for laminated glass (1) and used as a raw material in the production of the intermediate film for laminated glass (2) to the total amount of the intermediate film for laminated glass (2). More specifically, it is calculated by the method described in the Examples. The recycle rate of the intermediate film for laminated glass is preferably 0.1% or more, more preferably 1% or more, even more preferably 10% or more, even more preferably 20% or more, especially preferably 40% or more, especially more preferably 60% or more, particularly preferably 80% or more, and may be 100%. When the recycle rate of the intermediate film for laminated glass is within the above ranges, the method for recycling the intermediate film for laminated glass of the present invention is more excellent in ecology and economic performance.

(Laminated Glass)

The present invention also relates to a laminated glass, comprising the intermediate film for laminated glass (2) obtained by the recycling method of the present invention which is arranged between at least two glasses. By using the intermediate film for laminated glass (2) obtained by the recycling method of the present invention, a laminated glass excellent in transparency can be obtained. Therefore, the intermediate film for laminated glass of the present invention can be preferably used for an automotive windshield, an automotive side glass, an automotive sunroof, an automotive rear glass, a head-up display glass, or an architectural glass. In a case where the laminated glass having the structure of the intermediate film for laminated glass (2) obtained by the recycling method of the present invention is applied to the head-up display glass, the cross-sectional shape of the intermediate film for laminated glass is preferably a shape in which one end is thick and the other end is thin. In this case, the cross-sectional shape may be an overall wedge shape which gradually becomes thinner from one end to the other end, or a shape partly having wedge-shaped cross section which has the same thickness from one end to any position between the one end and the other end and becomes thinner from the position to the other end.

A thickness of a glass for the laminated glass of the present invention is not particularly limited. The thickness is preferably 100 mm or less, more preferably 50 mm or less, even more preferably 10 mm or less. At least two glasses constituting the laminated glass of the present invention may have the same thickness or different thicknesses.

The glass for the laminated glass of the present invention is not particularly limited. A well-known organic glass such as polymethyl methacrylate and polycarbonate can be used in addition to an inorganic glass such as a float plate glass, a polished plate glass, a mold plate glass, a wire net-reinforced plate glass and a heat ray absorbing plate glass. These glasses may be colorless, colored, transparent or non-transparent. These glasses may be used alone, or may be used in combination of two or more. A shape of the glass used is not particularly limited. The glass may be a plate glass with a simple planar shape or a glass with curvature such as a glass for an automotive sunroof.

For the laminated glass in which the intermediate film for laminated glass (2) obtained by the recycling method of the present invention is arranged between two clear glasses, a haze measured according to JIS K 7105 is preferably 10 or less, more preferably 5 or less, even more preferably 3 or less, especially preferably 1 or less. When the haze is more than 10, visibility through the laminated glass tends to decrease.

(Method for Producing Laminated Glass)

The laminated glass of the present invention can be produced by a well-known method. Examples of such a method include a method using a vacuum laminator device, a method using a vacuum bag, a method using a vacuum ring, and a method using a nip roll. In addition, a method in which a laminate obtained after a temporary pressure bonding is subjected to an autoclave step can be additionally performed.

In a case where the vacuum laminator device is used, for example, a well-known device used for producing a solar cell can be used, and laminating is performed under conditions of a reduced pressure of $1 \times 10^{-6}$ MPa or more and $3 \times 10^{-2}$ MPa or less and a temperature of 100° C. or more and 200° C. or less, especially 130° C. or more and 170° C. or less. The method using the vacuum bag or the vacuum ring is disclosed in, for example, EP 1235683, and laminating is performed under conditions of a pressure of about $2 \times 10^{-2}$ MPa and a temperature of 130° C. or more and 145° C. or less.

In a case where the nip roll is used, for example, a method can be adopted in which a first temporary pressure bonding is performed at a temperature below the flow start temperature of the resin used for the intermediate film for laminated glass, and then a further temporary pressure bonding is performed at a temperature close to the flow start temperature. Concretely, a method can be adopted in which degassing is performed with a roll after heating to 30° C. or more and 100° C. or less with a device such as an infrared heater, and then pressure bonding is performed with a roll after heating to 50° C. or more and 150° C. or less to bond or temporarily bond.

The laminated glass may be produced by arranging glasses coated with the B layer on both surfaces of the intermediate film for laminated glass (2) and laminating them so that the laminated glass has the structure of the intermediate film for laminated glass (2) of the present invention.

The autoclave step additionally performed after the temporary pressure bonding can be performed, for example, under conditions of a pressure of 1 MPa or more and 15 MPa or less and a temperature of 120° C. or more and 160° C. or less in 0.5 hour or more and 2 hours or less, which depend on the thickness or structure of the laminated glass.

EXAMPLES

The present invention will hereinafter be explained in more detail by Examples and Comparative Examples. However, the present invention is not limited by these Examples. In the following Examples, "%" means "% by mass" unless otherwise specified.

1. Calculation of Recycle Rate of Intermediate Film for Laminated Glass

A recycle rate of an intermediate film for laminated glass was calculated by the following formula. In the formula, $W_2$ means a mass of an intermediate film for laminated glass (2), and each of $W_A$ and $W_B$ respectively means mass of a resin derived from an A layer or a B layer which was obtained by separating from an intermediate film for laminated glass (1) in mass of a resin for an a layer or a resin for a b layer which was used for producing the intermediate film for laminated glass (2) [that is, for reusing the intermediate film for laminated glass (1)].

Recycle rate (%)=$(W_A+W_B) \times 100/W_2$

2. Measurement of Haze of Laminated Glass

A laminated glass was produced by sandwiching an intermediate film for laminated glass (1) or an intermediate film for laminated glass (2), which was obtained in Examples or Comparative Examples, between two commercially available clear glasses (50 mm length×50 mm width×2 mm thickness), and using the vacuum bag method (conditions: raising a temperature from 30° C. to 160° C. in 60 minutes and then holding at 160° C. for 30 minutes). Then, in accordance with JIS K 7105, a haze of the laminated glass was measured by use of a haze meter (HZ-1) manufactured by Suga Test Instruments Co., Ltd. The evaluation results are shown in Table 1.

(Production of Thermoplastic Elastomer)
<TPE-1>

A nitrogen-substituted and dried pressure vessel was charged with 50 kg of cyclohexane as a solvent, and 130 g of 10.5% by mass cyclohexane solution of sec-butyl lithium as an anion polymerization initiator (13.9 g as sec-butyl lithium), and charged with 290 g of tetrahydrofuran as a Lewis base. After raising a temperature in the pressure vessel to 50° C., 1.8 kg of styrene was added and polymerization was performed for 1 hour, followed by adding 13.2 kg of isoprene and polymerizing for 2 hours, and further adding 1.8 kg of styrene and polymerizing for 1 hour to obtain a reaction liquid containing a polystyrene-polyisoprene-polystyrene triblock copolymer.

To the reaction liquid, a Ziegler hydrogenation catalyst formed from nickel octylate and trimethyl aluminum was added under an atmosphere of hydrogen, and a reaction was performed under conditions of a hydrogen pressure of 1 MPa and 80° C. for 5 hours. After the reaction liquid was allowed to cool and release, the catalyst was removed by washing with water, and then vacuum drying was performed to obtain a hydrogenated product of a polystyrene-polyisoprene-polystyrene triblock copolymer (hereinafter referred to as TPE-1).
<TPE-2>

A nitrogen-substituted and dried pressure vessel was charged with 50 kg of cyclohexane as a solvent, and 76 g of 10.5% by mass cyclohexane solution of sec-butyl lithium as an anion polymerization initiator (8.0 g as sec-butyl lithium), and charged with 313 g of tetrahydrofuran as a Lewis base. After raising a temperature in the pressure vessel to 50° C., 0.5 kg of styrene was added and polymerization was performed for 1 hour, followed by adding a liquid mixture of 8.2 kg of isoprene and 6.5 kg of butadiene and polymerizing for 2 hours, and further adding 1.5 kg of styrene and polymerizing for 1 hour to obtain a reaction liquid containing a polystyrene-poly(isoprene/butadiene)-polystyrene triblock copolymer.

To the reaction liquid, a Ziegler hydrogenation catalyst formed from nickel octylate and trimethyl aluminum was added under an atmosphere of hydrogen, and a reaction was performed under conditions of a hydrogen pressure of 1 MPa and 80° C. for 5 hours. The reaction liquid was allowed to cool and release, and then the catalyst was removed by washing with water, followed by vacuum drying to obtain a hydrogenated product of a polystyrene-poly(isoprene/butadiene)-polystyrene triblock copolymer (hereinafter referred to as TPE-2).
<TPE-3>

TPE-3 was obtained by melt-mixing TPE-1 and TPE-2 in a mass ratio of 1:1 at 220° C.

(Production of Polyvinyl Acetal Resin)
<PVB-1>

A 5 liter glass container equipped with a reflux condenser, a thermometer and an anchor-type stirring blade was charged with 4000 g of ion exchange water and 400 g of polyvinyl alcohol (a viscosity-average polymerization degree: 2400, a saponification degree: 92 mol %), and heated to 95° C. to completely dissolve the polyvinyl alcohol. The resulting solution was gradually cooled to 10° C. over about 30 minutes with stirring at 120 rpm, and then 231 g of butyraldehyde and 200 mL of 20% aqueous hydrochloric acid solution were added. Thereafter, the temperature was raised to 70° C. over 60 minutes, kept at 70° C. for 100 minutes, and then cooled to room temperature. After washing the resulting resin with ion exchange water, an aqueous sodium hydroxide solution was added to neutralize the remaining acid, and the resulting resin was washed with excess ion exchange water and dried to obtain polyvinyl butyral (hereinafter referred to as PVB-1). PVB-1 was analyzed according to JIS K 6728. The average butyralization degree (average acetalization degree) was 74 mol %, the average residual vinyl ester group amount was 7 mol %, and the average residual hydroxyl group amount was 19 mol %.
<PVB-2>

Polyvinyl butyral (hereinafter referred to PVB-2) was obtained in the same manner as in the production of PVB-1 except that polyvinyl alcohol with a viscosity-average polymerization degree of 1700 and a saponification degree of 99 mol % was used and an amount of used butyraldehyde was changed to 228 g. PVB-2 was analyzed according to JIS K 6728. The average butyralization degree (average acetalization degree) was 69 mol %, the average residual vinyl ester group amount was 1 mol %, and the average residual hydroxyl group amount was 30 mol %.

Example 1

[i] A T-die (multi manifold type: a width of 400 mm) set at 185° C. was charged with a composition for an A layer, consisting of 100 parts by mass of PVB-1, 60 parts by mass of triethylene glycol-di-2-ethyl hexanoate as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 170° C. and a discharge amount of 2.5 kg/hour. On the other hand, the T-die was charged with a composition for a B layer, consisting of 100 parts by mass of PVB-2, 40 parts by mass of triethylene glycol-di-2-ethyl hexanoate as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 26 mmφ vent-type twin screw extruder under conditions of a temperature of 200° C. and a discharge amount of 10 kg/hour. A form coextruded from the T-die was nipped by two metal embossing rolls with a surface temperature of 15° C., and taken up at a take-up speed of 0.5 m/min to obtain an intermediate film for laminated glass (1)-1 having a thickness of 0.75 mm and a three-layer structure of B layer/A layer/B layer (0.30 mm/0.15 mm/0.30 mm).

[ii] The intermediate film for laminated glass (1)-1 with a surface temperature of 23° C. was peeled off by hand at an interface between the A layer and the B layer to obtain a sheet-1 consisting of the B layer with a thickness of 0.30 mm as a single layer (on which no adhesion of the A layer was visually observed) and a sheet-2 having a two-layer structure of A layer/B layer (0.15 mm/0.30 mm).

[iii] A T-die (multi manifold type: a width of 400 mm) set at 185° C. was charged with a composition for an a layer, consisting of 100 parts by mass of PVB-1, 60 parts by mass of triethylene glycol-di-2-ethyl hexanoate as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 170° C. and a discharge amount of 2.5 kg/hour. On the other hand, the T-die was charged with 100 parts by mass of the sheet-1 as a resin for a b layer, by use of a 26 mmφ vent-type twin screw extruder under conditions of a temperature of 200° C. and a discharge amount of 10 kg/hour. A form coextruded from the T-die was nipped by two metal embossing rolls with a surface temperature of 15° C., and taken up at a take-up speed of 0.5 m/min to obtain an intermediate film for laminated glass (2)-2 having a thickness of 0.75 mm and a three-layer structure of b layer/a layer/b layer (0.30 mm/0.15 mm/0.30 mm).

Example 2

A T-die (multi manifold type: a width of 400 mm) set at 185° C. was charged with a composition for an a layer, consisting of 100 parts by mass of PVB-1, 60 parts by mass of triethylene glycol-di-2-ethyl hexanoate as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 170° C. and a discharge amount of 2.5 kg/hour. On the other hand, the T-die was charged with a composition for a b layer, consisting of 100 parts by mass of the sheet-1 in Example 1 [ii], 70 parts by mass of PVB-2, 28 parts by mass of triethylene glycol-di-2-ethyl hexanoate as a plasticizer, 0.07 part by mass of 2,6-di-t-butyl-4-methylphenol as an antioxidant and 0.14 part by mass of 2-(5-chloro-2-benzotriazolyl)-6-tert-butyl-p-cresol as an ultraviolet absorber, by use of a 26 mmφ vent-type twin screw extruder under conditions of a temperature of 200° C. and a discharge amount of 10 kg/hour. A form coextruded from the T-die was nipped by two metal embossing rolls with a surface temperature of 15° C., and taken up at a take-up speed of 0.5 m/min to obtain an intermediate film for laminated glass (2)-3 having a thickness of 0.75 mm and a three-layer structure of b layer/a layer/b layer (0.30 mm/0.15 mm/0.30 mm).

Example 3

A T-die (multi manifold type: a width of 400 mm) set at 185° C. was charged with a composition for an a layer, consisting of 100 parts by mass of PVB-1, 60 parts by mass of triethylene glycol-di-2-ethyl hexanoate as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 170° C. and a discharge amount of 2.5 kg/hour. On the other hand, the T-die was charged with a composition for a b layer, consisting of 100 parts by mass of the sheet-1 in Example 1 [ii], 200 parts by mass of PVB-2, 80 parts by mass of triethylene glycol-di-2-ethyl hexanoate as a plasticizer, 0.2 part by mass of 2,6-di-t-butyl-4-methylphenol as an antioxidant and 0.4 part by mass of 2-(5-chloro-2-benzotriazolyl)-6-tert-butyl-p-cresol as an ultraviolet absorber, by use of a 26 mmφ vent-type twin screw extruder under conditions of a temperature of 200° C. and a discharge amount of 10 kg/hour. A form coextruded from the T-die was nipped by two metal embossing rolls with a surface temperature of 15° C., and taken up at a take-up speed of 0.5 m/min to obtain an intermediate film for laminated glass (2)-4 having a thickness of 0.75 mm and a three-layer structure of b layer/a layer/b layer (0.30 mm/0.15 mm/0.30 mm).

Example 4

A T-die (single manifold type: a width of 400 mm) set at 170° C. was charged with 100 parts by mass of the sheet-1 in Example 1 [ii] by use of a 26 mmφ vent-type twin screw extruder under conditions of a temperature of 170° C. and a discharge amount of 12.5 kg/hour. A form extruded from the T-die was nipped by two metal embossing rolls with a surface temperature of 15° C., and taken up at a take-up speed of 0.5 m/min to obtain an intermediate film for laminated glass (2)-5 having a thickness of 0.75 mm and a single-layer structure.

Example 5

[i] A T-die (multi manifold type: a width of 400 mm) set at 210° C. was charged with a composition for an A layer, consisting of 100 parts by mass of TPE-1, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.4 kg/hour. On the other hand, the T-die was charged with a composition for a B layer, consisting of 100 parts by mass of PVB-2, 40 parts by mass of a polyester polyol [Kuraray Polyol P-510 manufactured by Kuraray Co., Ltd: poly[(3-methyl-1,5-pentanediol)-alt-(adipic acid)]] as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 26 mmφ vent-type twin screw extruder under conditions of a temperature of 200° C. and a discharge amount of 8.3 kg/hour. A form coextruded from the T-die was nipped by two metal embossing rolls with a surface temperature of 15° C., and taken up at a take-up speed of 0.5 m/min to obtain an intermediate film for laminated glass (1)-6 having a thickness of 0.75 mm and a three-layer structure of B layer/A layer/B layer (0.25 mm/0.25 mm/0.25 mm).

[ii] The intermediate film for laminated glass (1)-6 with a surface temperature of 23° C. was peeled off by hand at an interface between the A layer and the B layer to obtain the B layer as a single layer and a sheet having a two-layer structure of A layer/B layer which was further peeled off by hand at an interface between the A layer and the B layer. Thus, two sheet-3 consisting of the B layer as a single layer with a thickness of 0.25 mm (on which no adhesion of the A layer was visually observed) and a sheet-4 consisting of the A layer as a single layer with a thickness of 0.25 mm (on which no adhesion of the B layer was visually observed) were obtained.

[iii] A T-die (multi manifold type: a width of 400 mm) set at 210° C. was charged with a composition for an a layer, consisting of 100 parts by mass of TPE-1, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.4 kg/hour. On the other hand, the T-die was charged with 100 parts by mass of the sheet-3 as a resin for a b layer, by use of a 26 mmφ vent-type twin screw extruder under conditions of a temperature of 200° C. and a discharge amount of 8.3 kg/hour. A form coextruded from the T-die was nipped by two metal embossing rolls with a surface temperature of 15° C., and taken up at a take-up speed of 0.5 m/min to obtain an intermediate film for laminated glass (2)-7 having a thickness of 0.75 mm and a three-layer structure of b layer/a layer/b layer (0.25 mm/0.25 mm/0.25 mm).

Example 6

[i] A T-die (multi manifold type: a width of 400 mm) set at 205° C. was charged with a composition for an A layer, consisting of 100 parts by mass of TPE-1, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of an ionomer resin [SentryGlas (registered trademark) manufactured by DuPont] as a resin for a B layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (1)-8 having a thickness of 0.75 mm and a three-layer structure of B layer/A layer/B layer (0.25 mm/0.25 mm/0.25 mm).

[ii] The intermediate film for laminated glass (1)-8 with a surface temperature of 23° C. was peeled off by hand at an interface between the A layer and the B layer to obtain the B layer as a single layer and a sheet having a two-layer structure of A layer/B layer which was further peeled off by hand at an interface between the A layer and the B layer. Thus, two sheet-5 consisting of the B layer as a single layer with a thickness of 0.25 mm (on which no adhesion of the A layer was visually observed) and a sheet-6 consisting of the A layer as a single layer with a thickness of 0.25 mm (on which no adhesion of the B layer was visually observed) were obtained.

[iii] A T-die (multi manifold type: a width of 400 mm) set at 205° C. was charged with a composition for an a layer, consisting of 100 parts by mass of TPE-1, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of the sheet-5 as a resin for a b layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-9 having a thickness of 0.75 mm and a three-layer structure of b layer/a layer/b layer (0.25 mm/0.25 mm/0.25 mm).

Example 7

A T-die (multi manifold type: a width of 400 mm) set at 205° C. was charged with 100 parts by mass of the sheet-6 in Example 6 [ii] as a resin for an a layer by use of a 20 mmφ vent-type twin screw extruder under conditions of a temperature of 220° C. and a discharge amount of 3.6 kg/hour. On the other hand, the T-die was charged with 100 parts by mass of the sheet-5 in Example 6 [ii] as a resin for a b layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-10 having a thickness of 0.75 mm and a three-layer structure of b layer/a layer/b layer (0.25 mm/0.25 mm/0.25 mm).

Example 8

A T-die (single manifold type: a width of 400 mm) set at 190° C. was charged with 100 parts by mass of the sheet-5 in Example 6 [ii] by use of a 26 mmφ vent-type twin screw extruder under conditions of a temperature of 190° C. and a discharge amount of 12.5 kg/hour. A form extruded from the T-die was nipped by two metal embossing rolls with a surface temperature of 15° C., and taken up at a take-up speed of 0.5 m/min to obtain an intermediate film for laminated glass (2)-11 having a thickness of 0.75 mm and a single-layer structure.

Example 9

[i] A T-die (multi manifold type: a width of 400 mm) set at 205° C. was charged with a composition for an A layer, consisting of 100 parts by mass of TPE-2, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of an ionomer resin [SentryGlas (registered trademark) manufactured by DuPont] as a resin for a B layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (1)-12 having a thickness of 0.75 mm and a three-layer structure of B layer/A layer/B layer (0.25 mm/0.25 mm/0.25 mm).

[ii] The intermediate film for laminated glass (1)-12 with a surface temperature of 23° C. was peeled off by hand at an interface between the A layer and the B layer to obtain the B layer as a single layer and a sheet having a two-layer structure of A layer/B layer which was further peeled off by hand at an interface between the A layer and the B layer. Thus, two sheet-7 consisting of the B layer as a single layer with a thickness of 0.25 mm (on which no adhesion of the A layer was visually observed) and a sheet-8 consisting of the A layer as a single layer with a thickness of 0.25 mm (on which no adhesion of the B layer was visually observed) were obtained.

[iii] A T-die (multi manifold type: a width of 400 mm) set at 205° C. was charged with a composition for an a layer, consisting of 100 parts by mass of TPE-2, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of the sheet-7 as a resin for a b layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-13 having a thickness of 0.75 mm and a three-layer structure of b layer/a layer/b layer (0.25 mm/0.25 mm/0.25 mm).

Example 10

[i] A T-die (multi manifold type: a width of 400 mm) set at 205° C. was charged with a composition for an A layer, consisting of 100 parts by mass of TPE-3, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of an ionomer resin [SentryGlas (registered trademark) manufactured by DuPont] as a resin for a B layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (1)-14 having a thickness of 0.75 mm and a three-layer structure of B layer/A layer/B layer (0.25 mm/0.25 mm/0.25 mm).

[ii] The intermediate film for laminated glass (1)-14 with a surface temperature of 23° C. was peeled off by hand at an interface between the A layer and the B layer to obtain the B layer as a single layer and a sheet having a two-layer structure of A layer/B layer which was further peeled off by hand at an interface between the A layer and the B layer. Thus, two sheet-9 consisting of the B layer as a single layer with a thickness of 0.25 mm (on which no adhesion of the A layer was visually observed) and a sheet-10 consisting of the A layer as a single layer with a thickness of 0.25 mm (on which no adhesion of the B layer was visually observed) were obtained.

[iii] A T-die (multi manifold type: a width of 400 mm) set at 205° C. was charged with a composition for an a layer, consisting of 100 parts by mass of TPE-3, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of the sheet-9 as a resin for a b layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-15 having a thickness of 0.75 mm and a three-layer structure of b layer/a layer/b layer (0.25 mm/0.25 mm/0.25 mm).

Example 11

[i] A T-die (multi manifold type: a width of 400 mm) set at 205° C. was charged with a composition for an A layer, consisting of 100 parts by mass of TPE-3, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.0 kg/hour. On the other hand, the T-die was charged with 100 parts by mass of an ionomer resin [SentryGlas (registered trademark) manufactured by DuPont] as a resin for a B layer by use of a 26 mmφ vent-type twin screw extruder under conditions of a temperature of 190° C. and a discharge amount of 7.8 kg/hour. A form coextruded from the T-die was nipped by two metal embossing rolls with a surface temperature of 15° C., and taken up at a take-up speed of 0.5 m/min to obtain an intermediate film for laminated glass (1)-16 having a thickness of 0.75 mm and a three-layer structure of B layer/A layer/B layer (0.27 mm/0.21 mm/0.27 mm).

[ii] The intermediate film for laminated glass (1)-16 with a surface temperature of 23° C. was peeled off by hand at an interface between the A layer and the B layer to obtain the B layer as a single layer and a sheet having a two-layer structure of A layer/B layer which was further peeled off by hand at an interface between the A layer and the B layer. Thus, two sheet-11 consisting of the B layer as a single layer with a thickness of 0.27 mm (on which no adhesion of the A layer was visually observed) and a sheet-12 consisting of the A layer as a single layer with a thickness of 0.21 mm (on which no adhesion of the B layer was visually observed) were obtained.

[iii] A T-die (multi manifold type: a width of 400 mm) set at 205° C. was charged with a composition for an a layer, consisting of 100 parts by mass of TPE-3, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of the sheet-1 as a resin for a b layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-17 having a thickness of 0.75 mm and a three-layer structure of b layer/a layer/b layer (0.27 mm/0.21 mm/0.27 mm).

Example 12

A T-die (multi manifold type: a width of 400 mm) set at 205° C. was charged with a composition for an a layer, consisting of 100 parts by mass of TPE-3, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of the sheet-11 in Example 11 [ii] and 100 parts by mass of an ionomer resin [SentryGlas (registered trademark) manufactured by DuPont] by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-18 having a thickness of 0.75 mm and a three-layer structure of b layer/a layer/b layer (0.27 mm/0.21 mm/0.27 mm).

Example 13

The intermediate film for laminated glass (1)-1 in Example 1 [i] with a surface temperature of 13° C. was sliced by moving the intermediate film at an angle of 90 degrees relative to a lamination direction of the intermediate film by use of a slicer (a blade height projected from a board surface: 0.15 mm, a material of a blade: cemented carbide) as shown in FIG. 1, while pressing the intermediate film at an angle of 0 degree relative to the lamination direction of the intermediate film. Thus, a sheet-13 consisting of the B layer as a single layer with a thickness of 0.23 mm (on which no adhesion of the A layer was visually observed) and a sheet-14 having a three-layer structure of B layer/A layer/B layer (0.07 mm/0.15 mm/0.30 mm) were obtained.

An intermediate film for laminated glass (2)-19 having a thickness of 0.75 mm was obtained by use of the same method as in Example 1 except that the sheet-13 was used in place of the sheet-1.

Example 14

The intermediate film for laminated glass (1)-1 in Example 1 [i] was sliced by use of the same method as in Example 13 except that a surface temperature of the intermediate film was 18° C. Thus, a sheet-15 consisting of the B layer as a single layer with a thickness of 0.25 mm (on which no adhesion of the A layer was visually observed) and a sheet-16 having a three-layer structure of B layer/A layer/B layer (0.05 mm/0.15 mm/0.30 mm) were obtained.

An intermediate film for laminated glass (2)-20 having a thickness of 0.75 mm was obtained by use of the same method as in Example 1 except that the sheet-15 was used in place of the sheet-1.

Example 15

The intermediate film for laminated glass (1)-1 in Example 1 [i] was sliced by use of the same method as in Example 13 except that a blade height projected from a board surface was 0.12 mm. Thus, a sheet-17 consisting of the B layer as a single layer with a thickness of 0.17 mm (on which no adhesion of the A layer was visually observed) and a sheet-18 having a three-layer structure of B layer/A layer/B layer (0.13 mm/0.15 mm/0.30 mm) were obtained.

An intermediate film for laminated glass (2)-21 having a thickness of 0.75 mm was obtained by use of the same method as in Example 1 except that the sheet-17 was used in place of the sheet-1.

Example 16

An intermediate film for laminated glass (2)-22 having a thickness of 0.75 mm was obtained by use of the same method as in Example 2 except that the sheet-13 was used in place of the sheet-1.

Example 17

An intermediate film for laminated glass (2)-23 having a thickness of 0.75 mm was obtained by use of the same method as in Example 3 except that the sheet-13 was used in place of the sheet-1.

Example 18

An intermediate film for laminated glass (2)-24 having a thickness of 0.75 mm was obtained by use of the same method as in Example 4 except that the sheet-13 was used in place of the sheet-1.

Example 19

The intermediate film for laminated glass (1)-6 in Example 5 [i] was sliced by use of the same method as in Example 13 except that the intermediate film for laminated glass (1)-6 was used. Thus, a sheet-19 consisting of the B layer as a single layer with a thickness of 0.21 mm (on which no adhesion of the A layer was visually observed) and a sheet-20 having a three-layer structure of B layer/A layer/B layer (0.04 mm/0.25 mm/0.25 mm) were obtained.

An intermediate film for laminated glass (2)-25 having a thickness of 0.75 mm was obtained by use of the same method as in Example 5 except that the sheet-19 was used in place of the sheet-3.

Example 20

The intermediate film for laminated glass (1)-8 in Example 6 [i] was sliced by use of the same method as in Example 14 except that the intermediate film for laminated glass (1)-8 was used. Thus, a sheet-21 consisting of the B layer as a single layer with a thickness of 0.17 mm (on which no adhesion of the A layer was visually observed) and a sheet-22 having a three-layer structure of B layer/A layer/B layer (0.08 mm/0.25 mm/0.25 mm) were obtained.

An intermediate film for laminated glass (2)-26 having a thickness of 0.75 mm was obtained by use of the same method as in Example 6 except that the sheet-21 was used in place of the sheet-5.

Example 21

An intermediate film for laminated glass (2)-27 having a thickness of 0.75 mm was obtained by use of the same method as in Example 8 except that the sheet-21 was used in place of the sheet-5.

Example 22

The intermediate film for laminated glass (1)-12 in Example 9 [i] was sliced by use of the same method as in Example 14 except that the intermediate film for laminated glass (1)-12 was used. Thus, a sheet-23 consisting of the B layer as a single layer with a thickness of 0.19 mm (on which no adhesion of the A layer was visually observed) and a sheet-24 having a three-layer structure of B layer/A layer/B layer (0.06 mm/0.25 mm/0.25 mm) were obtained.

An intermediate film for laminated glass (2)-28 having a thickness of 0.75 mm was obtained by use of the same method as in Example 9 except that the sheet-23 was used in place of the sheet-7.

Example 23

The intermediate film for laminated glass (1)-14 in Example 10 [i] was sliced by use of the same method as in Example 14 except that the intermediate film for laminated glass (1)-14 was used. Thus, a sheet-25 consisting of the B layer as a single layer with a thickness of 0.18 mm (on which no adhesion of the A layer was visually observed) and a sheet-26 having a three-layer structure of B layer/A layer/B layer (0.07 mm/0.25 mm/0.25 mm) were obtained.

An intermediate film for laminated glass (2)-29 having a thickness of 0.75 mm was obtained by use of the same method as in Example 10 except that the sheet-25 was used in place of the sheet-9.

Example 24

The intermediate film for laminated glass (1)-16 in Example 11 [i] was sliced by use of the same method as in Example 14 except that the intermediate film for laminated glass (1)-16 was used. Thus, a sheet-27 consisting of the B layer as a single layer with a thickness of 0.17 mm (on which no adhesion of the A layer was visually observed) and a sheet-28 having a three-layer structure of B layer/A layer/B layer (0.10 mm/0.21 mm/0.27 mm) were obtained.

An intermediate film for laminated glass (2)-30 having a thickness of 0.75 mm was obtained by use of the same method as in Example 11 except that the sheet-27 was used in place of the sheet-11.

Example 25

An intermediate film for laminated glass (2)-31 having a thickness of 0.75 mm was obtained by use of the same method as in Example 12 except that the sheet-27 was used in place of the sheet-11.

Example 26

The sheet-14 obtained in Example 13 and having a surface temperature of 13° C. was set on a slicer, so that the surface of the B layer opposite to another B layer, from which sheet-13 was sliced off in Example 13, (that is, the surface of the B layer having a thickness of 0.30 mm) among the two B layers of the sheet-14 was in contact with a board surface. A slicing process was performed by the same method as in Example 13 to obtain a sheet-32 consisting of the B layer as a single layer with a thickness of 0.23 mm (on which no adhesion of the A layer was visually observed) and a sheet-33 having a three-layer structure of B layer/A layer/B layer (0.07 mm/0.15 mm/0.07 mm).

An intermediate film for laminated glass (2)-34 having a thickness of 0.75 mm was obtained by use of the same method as in Example 1 except that 50 parts by mass of the sheet-13 and 50 parts by mass of the sheet-32 were used in place of 100 parts by mass of the sheet-13.

Comparative Example 1

A T-die (multi manifold type: a width of 400 mm) set at 185° C. was charged with a composition for an a layer, consisting of 100 parts by mass of PVB-1, 60 parts by mass of triethylene glycol-di-2-ethyl hexanoate as a plasticizer, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 170° C. and a discharge amount of 2.5 kg/hour. On the other hand, the T-die was charged with 100 parts by mass of the intermediate film for laminated glass (1)-1 in Example 1 [i] as a resin for a b layer by use of a 26 mmφ vent-type twin screw extruder under conditions of a temperature of 200° C. and a discharge amount of 10 kg/hour. A form coextruded from the T-die was nipped by two metal embossing rolls with a surface temperature of 15° C., and taken up at a take-up speed of 0.5 m/min to obtain an intermediate film for laminated glass (2)-35 having a thickness of 0.75 mm and a three-layer structure of b layer/a layer/b layer (0.30 mm/0.15 mm/0.30 mm).

Comparative Example 2

A T-die (multi manifold type: a width of 400 mm) set at 210° C. was charged with a composition for an a layer, consisting of 100 parts by mass of TPE-1, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ·vent-type twin screw extruder under conditions of a temperature of 220° C. and a discharge amount of 3.4 kg/hour. On the other hand, the T-die was charged with 100 parts by mass of the intermediate film for laminated glass (1)-6 in Example 5 [i] as a resin for a b layer by use of a 26 mmφ vent-type twin screw extruder under conditions of a temperature of 200° C. and a discharge amount of 8.3 kg/hour. A form coextruded from the T-die was nipped by two metal embossing rolls with a surface temperature of 15° C., and taken up at a take-up speed of 0.5 m/min to obtain an intermediate film for laminated glass (2)-36 having a thickness of 0.75 mm and a three-layer structure of b layer/a layer/b layer (0.25 mm/0.25 mm/0.25 mm).

Comparative Example 3

A T-die (multi manifold type: a width of 400 mm) set at 205° C. was charged with a composition for an a layer, consisting of 100 parts by mass of TPE-1, 0.1 part by mass of 2,6-di-t-butyl-4-methylphenol as an antioxidant and 0.2 part by mass of 2-(5-chloro-2-benzotriazolyl)-6-tert-butyl-p-cresol as an ultraviolet absorber, by use of a 20 mmφ vent-type twin screw extruder under conditions of a temperature of 220° C. and a discharge amount of 3.6 kg/hour. On the other hand, the T-die was charged with 100 parts by mass of the intermediate film for laminated glass (1)-8 in Example 6 [i] as a resin for a b layer by use of a 26 mmφ vent-type twin screw extruder under conditions of a temperature of 190° C. and a discharge amount of 7.2 kg/hour. A form coextruded from the T-die was nipped by two metal embossing rolls with a surface temperature of 15° C., and taken up at a take-up speed of 0.5 m/min to obtain an intermediate film for laminated glass (2)-37 having a thickness of 0.75 mm and a three-layer structure of b layer/a layer/b layer (0.25 mm/0.25 mm/0.25 mm).

TABLE 1

| | | | Example 1 | 2 | 3 | 4 | 5 | 6 | 7 | 8 | 9 | 10 | 11 | 12 |
|---|---|---|---|---|---|---|---|---|---|---|---|---|---|---|
| intermediate film for laminated glass (1) | A layer | resin component (parts by mass) | | | | | | | | | | | | |
| | | PVB-1 | 100 | 100 | 100 | 100 | — | — | — | — | — | — | — | — |
| | | TPE-1 | — | — | — | — | 100 | 100 | 100 | 100 | — | — | — | — |
| | | TPE-2 | — | — | — | — | — | — | — | — | 100 | 100 | — | — |
| | | TPE-3 | — | — | — | — | — | — | — | — | — | — | 100 | 100 |
| | | plasticizer triethylene glycol di-2-ethyl hexanoate | 60 | 60 | 60 | 60 | — | — | — | — | — | — | — | — |
| | | antioxidant 2,6-di-t-butyl-4-methylphenol | 0.1 | 0.1 | 0.1 | 0.1 | 0.1 | 0.1 | 0.1 | 0.1 | 0.1 | 0.1 | 0.1 | 0.1 |
| | | ultraviolet absorber 2-(5-chloro-2-benzotriazolyl)-6-tert-butyl-p-cresol | 0.2 | 0.2 | 0.2 | 0.2 | 0.2 | 0.2 | 0.2 | 0.2 | 0.2 | 0.2 | 0.2 | 0.2 |
| | | thickness (mm) | 0.15 | 0.15 | 0.15 | 0.15 | 0.25 | 0.25 | 0.25 | 0.25 | 0.25 | 0.25 | 0.21 | 0.21 |
| | B layer | resin component (parts by mass) | | | | | | | | | | | | |
| | | PVB-2 | 100 | 100 | 100 | 100 | — | 100 | 100 | 100 | 100 | 100 | 100 | 100 |
| | | ionomer resin | — | — | — | — | 100 | — | — | — | — | — | — | — |
| | | plasticizer triethylene glycol di-2-ethyl hexanoate | 40 | 40 | 40 | 40 | — | — | — | — | — | — | — | — |
| | | polyester polyol | — | — | — | — | 40 | — | — | — | — | — | — | — |
| | | antioxidant 2,6-di-t-butyl-4-methylphenol | 0.1 | 0.1 | 0.1 | 0.1 | 0.1 | 0.1 | 0.1 | 0.1 | 0.1 | 0.1 | 0.1 | 0.1 |
| | | ultraviolet absorber 2-(5-chloro-2-benzotriazolyl)-6-tert-butyl-p-cresol | 0.2 | 0.2 | 0.2 | 0.2 | 0.2 | 0.2 | 0.2 | 0.2 | 0.2 | 0.2 | 0.2 | 0.2 |
| | | thickness (mm) | 0.30 | 0.30 | 0.30 | 0.30 | 0.25 | 0.25 | 0.25 | 0.25 | 0.25 | 0.25 | 0.27 | 0.27 |
| haze of laminated glass (%) | | | 0.4 | 0.4 | 0.4 | 0.4 | 0.5 | 0.3 | 0.3 | 0.3 | 0.4 | 0.3 | 0.2 | 0.2 |
| layer separation step | method | | — | — | — | — | — | peeling by hand | peeling by hand | — | — | — | — | — |
| | temperature (°C) | | — | — | — | — | — | 23 | 23 | — | — | — | — | — |
| | height of projected blade (mm) | | — | — | — | — | — | — | — | — | — | — | — | — |
| | number of sheet obtained by layer separation, and thickness of sheet (mm) | | sheet-1 0.30 | sheet-1 0.30 | sheet-1 0.30 | sheet-1 0.30 | sheet-3 0.25 | sheet-5 0.25 | sheet-5 0.25 sheet-6 0.25 | sheet-5 0.25 | sheet-7 0.25 | sheet-9 0.25 | sheet-11 0.27 | sheet-11 0.27 |
| intermediate film for laminated glass (2) | a layer | recycle component (parts by mass) sheet-6 | — | — | — | — | — | — | 100 | — | — | — | — | — |
| | | resin component (parts by mass) | | | | | | | | | | | | |
| | | polyvinyl acetal resin | 100 | 100 | 100 | 100 | 100 | 100 | — | 100 | 100 | 100 | 100 | 100 |
| | | thermoplastic elastomer | — | — | — | — | — | — | — | — | — | — | — | — |
| | | plasticizer triethylene glycol di-2-ethyl hexanoate | 60 | 60 | 60 | 60 | — | — | — | — | — | — | — | — |
| | | antioxidant 2,6-di-t-butyl-4-methylphenol | 0.1 | 0.1 | 0.1 | 0.1 | 0.1 | 0.1 | 0.1 | 0.1 | 0.1 | 0.1 | 0.1 | 0.1 |
| | | ultraviolet absorber 2-(5-chloro-2-benzotriazolyl)-6-tert-butyl-p-cresol | 0.2 | 0.2 | 0.2 | 0.2 | 0.2 | 0.2 | 0.2 | 0.2 | 0.2 | 0.2 | 0.2 | 0.2 |
| | | thickness (mm) | 0.15 | 0.15 | 0.15 | 0.15 | 0.25 | 0.25 | 0.25 | 0.25 | 0.25 | 0.25 | 0.21 | 0.21 |
| | b layer | recycle component (parts by mass) | | | | | | | | | | | | |
| | | sheet-1 | 100 | 100 | — | — | — | — | — | — | — | — | — | — |
| | | sheet-3 | — | — | 100 | — | — | — | — | — | — | — | — | — |
| | | sheet-5 | — | — | — | 100 | 100 | 100 | 100 | — | — | — | — | — |
| | | sheet-7 | — | — | — | — | — | — | — | 100 | — | — | — | — |
| | | sheet-9 | — | — | — | — | — | — | — | — | 100 | — | — | — |
| | | sheet-11 | — | — | — | — | — | — | — | — | — | 100 | — | — |
| | | sheet-13 | — | — | — | — | — | — | — | — | — | — | 100 | — |
| | | sheet-15 | — | — | — | — | — | — | — | — | — | — | — | 100 |
| | | sheet-17 | — | — | — | — | — | — | — | — | — | — | — | — |
| | | sheet-19 | — | — | — | — | — | — | — | — | — | — | — | — |
| | | sheet-21 | — | — | — | — | — | — | — | — | — | — | — | — |

TABLE 1-continued

|  |  |  |  | | Example | | | | | | |
|---|---|---|---|---|---|---|---|---|---|---|---|
|  |  |  |  |  | 13 | 14 | 15 | 16 | 17 | 18 | 19 |
| intermediate film for laminated glass (1) |  |  | sheet-23 | 0.30 | — | — | — | — | — | — | — |
|  |  |  | sheet-25 | 80 | — | — | — | — | — | — | — |
|  |  |  | sheet-27 | — | — | — | — | — | — | — | — |
|  |  |  | sheet-32 | — | — | — | — | — | — | — | — |
|  |  |  | intermediate film for laminated glass(1)-1 | — | — | — | — | — | — | — | — |
|  |  |  | intermediate film for laminated glass(1)-6 | — | — | — | — | — | — | — | — |
|  |  |  | intermediate film for laminated glass(1)-8 | — | — | — | — | — | — | — | — |
|  |  | resin component | polyvinyl acetal resin | — | — | — | — | — | — | — | — |
|  |  |  | PVB-2 | 200 | — | — | — | — | — | — | — |
|  |  |  | ionomer resin | — | — | — | — | — | — | — | — |
|  |  | plasticizer | triethylene glycol di-2-ethyl hexanoate | 80 | — | — | — | — | — | — | — |
|  |  | antioxidant | 2,6-di-t-butyl-4-methylphenol | 0.2 | — | — | — | — | — | — | — |
|  |  | ultraviolet absorber | 2-(5-chloro-2-benzotriazolyl)-6-tert-butyl-p-cresol | 0.4 | — | — | — | — | — | — | — |
|  | thickness (mm) |  |  | 0.30 | — | — | — | — | — | — | — |
|  | recycle rate (%) |  |  | 21 | — | — | — | — | — | — | — |
| haze of laminated glass (%) |  |  |  | 0.4 | — | — | — | — | — | — | — |
| intermediate film for laminated glass (1) | A layer | resin component | polyvinyl acetal resin | | 100 | 100 | 100 | 100 | 100 | 100 | — |
|  |  |  | PVB-1 | | — | — | — | — | — | — | — |
|  |  |  | thermoplastic elastomer | | — | — | — | — | — | — | 100 |
|  |  |  | TPE-1 | | — | — | — | — | — | — | — |
|  |  |  | TPE-2 | | — | — | — | — | — | — | — |
|  |  |  | TPE-3 | | — | — | — | — | — | — | — |
|  |  | (parts by mass) |  | | 60 | 60 | 60 | 60 | 60 | 60 | — |
|  |  | plasticizer | triethylene glycol di-2-ethyl hexanoate | | 0.1 | 0.1 | 0.1 | 0.1 | 0.1 | 0.1 | 0.1 |
|  |  | antioxidant | 2,6-di-t-butyl-4-methylphenol | | 0.2 | 0.2 | 0.2 | 0.2 | 0.2 | 0.2 | 0.2 |
|  |  | ultraviolet absorber | 2-(5-chloro-2-benzotriazolyl)-6-tert-butyl-p-cresol | | 0.15 | 0.15 | 0.15 | 0.15 | 0.15 | 0.15 | 0.25 |
|  | thickness (mm) |  |  | | — | — | — | — | — | — | — |
|  | B layer | resin component | polyvinyl acetal resin | | 100 | 100 | 100 | 100 | 100 | 100 | 100 |
|  |  |  | PVB-2 | | — | — | — | — | — | — | — |
|  |  |  | ionomer resin | | — | — | — | — | — | — | — |
|  |  | plasticizer | triethylene glycol di-2-ethyl hexanoate | | 40 | 40 | 40 | 40 | 40 | 40 | 40 |
|  |  |  | polyester polyol | | — | — | — | — | — | — | — |
|  |  | antioxidant | 2,6-di-t-butyl-4-methylphenol | | 0.1 | 0.1 | 0.1 | 0.1 | 0.1 | 0.1 | 0.1 |
|  |  | ultraviolet absorber | 2-(5-chloro-2-benzotriazolyl)-6-tert-butyl-p-cresol | | 0.2 | 0.2 | 0.2 | 0.2 | 0.2 | 0.2 | 0.2 |
|  | thickness (mm) |  |  | | 0.30 | 0.30 | 0.30 | 0.30 | 0.30 | 0.30 | 0.25 |
| haze of laminated glass (%) |  |  |  | | 0.4 | 0.4 | 0.4 | 0.4 | 0.4 | 0.4 | 0.5 |
| layer separation step | method |  |  | | 13 | 18 | 13 | 13 | 13 | 13 | 13 |
|  | temperature (° C.) |  |  | | 0.15 | 0.15 | 0.12 | 0.15 | 0.15 | 0.15 | 0.15 |
|  | height of projected blade (mm) |  |  | | sheet-13 | sheet-15 | sheet-17 | sheet-13 | sheet-13 | sheet-13 | sheet-19 |
|  | number of sheet obtained by layer separation, and thickness of sheet (mm) |  |  | | 0.23 | 0.25 | 0.17 | 0.23 | 0.23 | 0.23 | 0.21 |
| intermediate film for laminated glass (2) | recycle component | | sheet-6 | | — | — | — | — | — | — | — |
|  |  | (parts by mass) | | | 100 | 100 | 100 | 100 | 100 | — | — |
|  | resin component | | polyvinyl acetal resin | | — | — | — | — | — | — | — |
|  |  | | PVB-1 | | — | — | — | — | — | 100 | 100 |
|  |  | | thermoplastic elastomer | | — | — | — | — | — | — | — |
|  |  | | TPE-1 | | — | — | — | — | — | — | — |
|  |  | | TPE-2 | | — | — | — | — | — | — | — |
|  |  | | TPE-3 | | — | — | — | — | — | — | — |

TABLE 1-continued

| | | | | | Example | | | | | |
|---|---|---|---|---|---|---|---|---|---|---|
| | | | | 20 | 21 | 22 | 23 | 24 | 25 | 26 |
| | | plasticizer | triethylene glycol di-2-ethyl hexanoate | 60 | 60 | 60 | 60 | 60 | — | — |
| | | antioxidant | 2,6-di-t-butyl-4-methylphenol | 0.1 | 0.1 | 0.1 | 0.1 | 0.1 | — | 0.1 |
| | | ultraviolet absorber | 2-(5-chloro-2-benzotriazolyl)-6-tert-butyl-p-cresol | 0.2 | 0.2 | 0.2 | 0.2 | 0.2 | — | 0.2 |
| | | thickness (mm) | | 0.15 | 0.15 | 0.15 | 0.15 | 0.15 | — | 0.25 |
| | b layer | recycle component (parts by mass) | sheet-1 | 100 | — | — | — | — | — | — |
| | | | sheet-3 | — | 100 | — | — | — | — | — |
| | | | sheet-5 | — | — | — | — | — | — | — |
| | | | sheet-7 | — | — | — | — | — | — | — |
| | | | sheet-9 | — | — | — | — | — | — | — |
| | | | sheet-11 | — | — | 100 | — | — | — | — |
| | | | sheet-13 | — | — | — | 100 | 100 | — | — |
| | | | sheet-15 | — | — | — | — | — | — | — |
| | | | sheet-17 | — | — | — | — | — | 100 | — |
| | | | sheet-19 | — | — | — | — | — | — | — |
| | | | sheet-21 | — | — | — | — | — | — | — |
| | | | sheet-23 | — | — | — | — | — | — | — |
| | | | sheet-25 | — | — | — | — | — | — | — |
| | | | sheet-27 | — | — | — | — | — | — | — |
| | | | sheet-32 | — | — | — | — | — | — | 100 |
| | | | intermediate film for laminated glass(1)-1 | — | — | — | — | — | — | — |
| | | | intermediate film for laminated glass(1)-6 | — | — | — | — | — | — | — |
| | | | intermediate film for laminated glass(1)-8 | — | — | — | — | — | — | — |
| | | resin component | polyvinyl acetal resin PVB-2 | — | — | 70 | 200 | — | — | — |
| | | | ionomer resin | — | — | — | — | — | — | — |
| | | plasticizer | triethylene glycol di-2-ethyl hexanoate | — | — | 28 | 80 | — | — | — |
| | | antioxidant | 2,6-di-t-butyl-4-methylphenol | — | — | 0.07 | 0.2 | — | — | — |
| | | ultraviolet absorber | 2-(5-chloro-2-benzotriazolyl)-6-tert-butyl-p-cresol | — | — | 0.14 | 0.4 | — | — | — |
| | | thickness (mm) | | 0.30 | 0.30 | 0.30 | 0.30 | 0.30 | 0.75 | 0.25 |
| | recycle rate (%) | | | 80 | 80 | 40 | 21 | 100 | 100 | 67 |
| haze of laminated glass (%) | | | | 0.5 | 0.5 | 0.4 | 0.4 | 0.4 | 0.4 | 0.7 |

| | | | | | | Example | | | | | |
|---|---|---|---|---|---|---|---|---|---|---|---|
| | | | | | 20 | 21 | 22 | 23 | 24 | 25 | 26 |
| intermediate film for laminated glass (1) | A layer | resin component (parts by mass) | polyvinyl acetal resin | PVB-1 | 100 | — | — | — | — | — | 100 |
| | | | thermoplastic elastomer | TPE-1 | — | 100 | — | — | — | — | — |
| | | | | TPE-2 | — | — | 100 | — | 100 | — | 60 |
| | | | | TPE-3 | — | — | — | 100 | — | 100 | — |
| | | plasticizer | triethylene glycol di-2-ethyl hexanoate | | — | — | — | — | — | — | 60 |
| | | antioxidant | 2,6-di-t-butyl-4-methylphenol | | 0.1 | 0.1 | 0.1 | 0.1 | 0.1 | 0.1 | 0.1 |
| | | ultraviolet absorber | 2-(5-chloro-2-benzotriazolyl)-6-tert-butyl-p-cresol | | 0.2 | 0.2 | 0.2 | 0.2 | 0.2 | 0.2 | 0.2 |
| | | thickness (mm) | | | 0.25 | 0.25 | 0.25 | 0.25 | 0.21 | 0.21 | 0.15 |

TABLE 1-continued

| | | | | | | | | | | | |
|---|---|---|---|---|---|---|---|---|---|---|---|
| B layer | resin component (parts by mass) | polyvinyl acetal resin | — | — | — | — | — | — | — | — | — |
| | | ionomer resin | — | — | — | — | — | — | — | — | — |
| | | PVB-2 | 100 | 100 | 100 | 100 | 100 | 100 | 100 | 100 | 100 |
| | plasticizer | triethylene glycol di-2-ethyl hexanoate | — | — | — | — | — | — | — | — | 40 |
| | | polyester polyol | — | — | — | — | — | — | — | — | — |
| | antioxidant | 2,6-di-t-butyl-4-methylphenol | 0.1 | — | — | — | — | — | — | — | 0.1 |
| | ultraviolet absorber | 2-(5-chloro-2-benzotriazolyl)-6-tert-butyl-p-cresol | 0.2 | — | — | — | — | — | — | — | 0.2 |
| | thickness (mm) | | 0.25 | 0.25 | 0.25 | 0.25 | 0.25 | 0.25 | 0.27 | 0.27 | 0.30 |
| haze of laminated glass (%) | | | 0.3 | 0.75 | 0.4 | 0.3 | 0.3 | 0.4 | 0.2 | 0.2 | 0.4 |
| layer separation step | method | | 18 | — | 18 | 18 | 18 | 18 | 18 | 18 | 13 |
| | temperature (°C) | | 0.15 | — | 0.15 | 0.15 | 0.15 | 0.15 | 0.15 | 0.15 | 0.15 |
| | height of projected blade (mm) | | sheet-21 | — | sheet-21 | sheet-23 | slice sheet-25 | sheet-27 | sheet-27 | sheet-13 | — |
| | number of sheet obtained by layer separation, and thickness of sheet (mm) | | 0.17 | — | 0.17 | 0.19 | 0.18 | 0.17 | 0.17 | 0.23 sheet-32 0.23 | — |

| | | | | | | | | | | | |
|---|---|---|---|---|---|---|---|---|---|---|---|
| intermediate film for laminated glass (2) | a layer | recycle component (parts by mass) | sheet-6 | — | — | — | — | — | — | — | — | — |
| | | resin component: polyvinyl acetal resin | 100 | — | — | — | — | — | — | 100 | — |
| | | thermoplastic elastomer | — | — | 100 | — | 100 | — | 100 | — | — |
| | | PVB-1 | — | — | — | — | — | — | — | — | — |
| | | TPE-1 | — | — | — | — | — | — | — | — | — |
| | | TPE-2 | — | — | — | — | — | — | — | — | — |
| | | TPE-3 | — | — | — | — | — | — | — | — | — |
| | plasticizer | triethylene glycol di-2-ethyl hexanoate | 0.1 | — | — | — | — | — | — | 0.1 | — |
| | antioxidant | 2,6-di-t-butyl-4-methylphenol | 0.2 | — | — | — | — | — | — | 0.2 | — |
| | ultraviolet absorber | 2-(5-chloro-2-benzotriazolyl)-6-tert-butyl-p-cresol | | | | | | | | | |
| | thickness (mm) | | 0.25 | — | — | 0.25 | — | 0.25 | — | 0.21 | 0.15 |
| | b layer | recycle component (parts by mass) | sheet-1 | — | — | — | — | — | — | — | — |
| | | sheet-3 | — | 100 | — | — | — | — | — | — | — |
| | | sheet-5 | — | — | 100 | — | — | — | — | — | — |
| | | sheet-7 | — | — | — | 100 | — | — | — | — | — |
| | | sheet-9 | — | — | — | — | 100 | — | — | — | — |
| | | sheet-11 | — | — | — | — | — | 100 | — | — | — |
| | | sheet-13 | — | — | — | — | — | — | — | — | — |
| | | sheet-15 | — | — | — | — | — | — | — | 50 | — |
| | | sheet-17 | — | — | — | — | — | — | — | — | — |
| | | sheet-19 | — | — | — | — | — | — | — | — | — |
| | | sheet-21 | 100 | — | — | — | — | — | — | — | — |
| | | sheet-23 | — | — | — | — | — | — | — | — | — |
| | | sheet-25 | — | — | — | — | — | — | — | — | 50 |
| | | sheet-27 | — | — | — | — | — | 100 | 100 | — | — |
| | | sheet-32 | — | — | — | — | — | — | — | — | — |
| | | intermediate film for laminated glass(1)-1 | — | — | — | — | — | — | — | — | — |
| | | intermediate film for laminated glass(1)-6 | — | — | — | — | — | — | — | — | — |
| | | intermediate film for laminated glass(1)-8 | — | — | — | — | — | — | — | — | — |
| | resin component | PVB-2 | — | — | — | — | — | — | — | — | 60 |
| | | ionomer resin | — | — | — | — | — | — | — | — | — |
| | plasticizer | triethylene glycol di-2-ethyl hexanoate | — | — | — | — | — | — | — | — | — |
| | antioxidant | 2,6-di-t-butyl-4-methylphenol | — | — | — | — | — | — | — | — | 0.1 |
| | ultraviolet absorber | 2-(5-chloro-2-benzotriazolyl)-6-tert-butyl-p-cresol | — | — | — | — | — | — | — | — | 0.2 |
| | thickness (mm) | | 0.25 | 0.75 | 0.25 | 0.25 | 0.25 | 0.25 | 0.27 | 0.27 | 0.30 |

TABLE 1-continued

| | | | | | | | | | | | Comparative Example | | |
|---|---|---|---|---|---|---|---|---|---|---|---|---|---|
| | | | | | | | | | | | 1 | 2 | 3 |
| | | | | | recycle rate (%) | | | 67 | 100 | 67 | 67 | 72 | 36 | 80 |
| | | | | | haze of laminated glass (%) | | | 0.4 | 0.2 | 0.4 | 0.4 | 0.3 | 0.2 | 0.5 |
| intermediate film for laminated glass (1) | A layer | resin component | | polyvinyl acetal resin | PVB-1 | | | 100 | | 100 | | | | |
| | | | | thermoplastic elastomer | TPE-1 | | | | | | 100 | | 100 | |
| | | | | | TPE-2 | | | | | | | | | |
| | | | | | TPE-3 | | | | | | | | | |
| | | (parts by mass) | plasticizer | triethylene glycol di-2-ethyl hexanoate | | | | 60 | | | | | | |
| | | | antioxidant | 2,6-di-t-butyl-4-methylphenol | | | | 0.1 | | 0.1 | 0.1 | 0.1 | 0.1 | |
| | | | ultraviolet absorber | 2-(5-chloro-2-benzotriazolyl)-6-tert-butyl-p-cresol | | | | 0.2 | | 0.2 | 0.2 | 0.2 | 0.2 | |
| | | thickness (mm) | | | | | | 0.15 | | 0.25 | 0.25 | 0.25 | 0.25 | |
| | B layer | resin component | | polyvinyl acetal resin | PVB-2 | | | 100 | | 100 | | | | |
| | | | | ionomer resin | | | | | | | 40 | | | |
| | | (parts by mass) | plasticizer | triethylene glycol di-2-ethyl hexanoate | | | | 40 | | | | | | |
| | | | | polyester polyol | | | | | | | | | | |
| | | | antioxidant | 2,6-di-t-butyl-4-methylphenol | | | | 0.1 | | 0.1 | 0.1 | | | |
| | | | ultraviolet absorber | 2-(5-chloro-2-benzotriazolyl)-6-tert-butyl-p-cresol | | | | 0.2 | | 0.2 | 0.2 | | | |
| | | thickness (mm) | | | | | | 0.30 | | 0.25 | 0.25 | | 0.3 | |
| haze of laminated glass (%) | | | | | | | | 0.4 | | 0.5 | | | | |
| layer separation step | method | | | | | | | | | | | | | |
| | temperature (° C.) | | | | | | | | | | | | | |
| | height of projected blade (mm) | | | | | | | | | | | | | |
| | number of sheet obtained by layer separation, and thickness of sheet (mm) | | | | | | | | | | | | | |
| intermediate film for laminated glass (2) | a layer | recycle component | | sheet-6 | | | | | | | | | | |
| | | resin component | | polyvinyl acetal resin | PVB-1 | | | 100 | | | 100 | | 100 | |
| | | | | thermoplastic elastomer | TPE-1 | | | | | | | | | |
| | | | | | TPE-2 | | | | | | | | | |
| | | | | | TPE-3 | | | | | | | | | |
| | | (parts by mass) | plasticizer | triethylene glycol di-2-ethyl hexanoate | | | | 60 | | | | | | |
| | | | antioxidant | 2,6-di-t-butyl-4-methylphenol | | | | 0.1 | | | 0.1 | | 0.1 | |
| | | | ultraviolet absorber | 2-(5-chloro-2-benzotriazolyl)-6-tert-butyl-p-cresol | | | | 0.2 | | | 0.2 | | 0.2 | |
| | | thickness (mm) | | | | | | 0.15 | | | 0.25 | | 0.25 | |
| | b layer | recycle component | | sheet-1 | | | | | | | | | | |
| | | | | sheet-3 | | | | | | | | | | |
| | | | | sheet-5 | | | | | | | | | | |
| | | | | sheet-7 | | | | | | | | | | |
| | | | | sheet-9 | | | | | | | | | | |
| | | | | sheet-11 | | | | | | | | | | |
| | | | | sheet-13 | | | | | | | | | | |
| | | | | sheet-15 | | | | | | | | | | |
| | | | | sheet-17 | | | | | | | | | | |
| | | | | sheet-19 | | | | | | | | | | |
| | | | | sheet-21 | | | | | | | | | | |

TABLE 1-continued

| | | | | |
|---|---|---|---|---|
| | sheet-23 | — | — | — |
| | sheet-25 | — | — | — |
| | sheet-27 | — | — | — |
| | sheet-32 | — | — | — |
| | intermediate film for laminated glass(1)-1 | 100 | — | — |
| | intermediate film for laminated glass(1)-6 | — | 100 | — |
| | intermediate film for laminated glass(1)-8 | — | — | 100 |
| resin | polyvinyl acetal resin PVB-2 | — | — | — |
| component | ionomer resin | — | — | — |
| plasticizer | triethylene glycol di-2-ethyl hexanoate | — | — | — |
| antioxidant | 2,6-di-t-butyl-4-methylphenol | — | — | — |
| ultraviolet absorber | 2-(5-chloro-2-benzotriazolyl)-6-tert-butyl-p-cresol | — | — | — |
| | thickness (mm) | 0.30 | 0.25 | 0.25 |
| recycle rate (%) | | 80 | 67 | 67 |
| haze of laminated glass (%) | | 14.5 | 23.9 | 25.1 |

As can be seen from Examples 1 to 26, the intermediate film for laminated glass (2) produced by separating the layer comprising the A layer and the layer comprising the B layer from the intermediate film for laminated glass (1), and using the layer comprising the A layer and the layer comprising the B layer, which were separated, as at least part of raw materials has the same haze at the time of producing the laminated glass as that of the intermediate film for laminated glass (1). In contrast, as can be seen from Comparative Examples 1 to 3, the intermediate film for laminated glass (2) produced by not separating the layer comprising the A layer and the layer comprising the B layer from the intermediate film for laminated glass (1), and reusing the intermediate film for laminated glass (1) as a raw material has high haze at the time of producing the laminated glass, and thus has less transparency. That is, the method for recycling an intermediate film for laminated glass of the present invention is a useful method, since it provides an intermediate film for laminated glass which maintains the transparency before recycle.

DESCRIPTION OF REFERENCE SIGNS 1 blade
2 slit
3 board surface
4 intermediate film for laminated glass (1)
h blade height projected from board surface

The invention claimed is:

1. A method for recycling an intermediate film for laminated glass, the intermediate film for laminated glass (1) comprising a first A layer and a first B layer, the method comprising separating a layer comprising the first A layer and a layer comprising the first B layer from the intermediate film for laminated glass (1),
wherein the separating is performed by cutting at least one of the first A layer and the first B layer.

2. The method of claim 1, wherein at least one of the layers com-prising the first A layer and the layer comprising the first B layer, which are separated, are used as at least part of raw materials to produce an intermediate film for laminated glass (2).

3. The method of claim 1, wherein the intermediate film for lami-nated glass (1) further comprises a plurality of B layers
wherein one B layer from the combined set of the first B layer the plurality of B layers is laminated on a first surface of the first A layer; and a different B layer from the combined set of the first B layer the plurality of B layers is laminated on a second surface of the first A layer.

4. The method of claim 1, wherein at least one of the first A layer and the first B layer comprises at least one resin selected from the group consisting of a polyvinyl acetal resin, an ionomer resin and a thermoplastic elastomer.

5. The method of claim 1, wherein the first A layer and the first B layer each comprise a polyvinyl acetal resin.

6. The method of claim 5, wherein the first A layer and the first B layer each further comprise a plasticizer.

7. The method of claim 1, wherein the first A layer comprises a thermoplastic elastomer and the B layer comprises an ionomer resin.

8. The method of claim 1, wherein the cutting step is performed by moving the intermediate film for laminated glass (1) along a surface to contact a blade extending from the surface.

9. The method of claim 1, wherein the cutting step is performed via a laser.

10. The method of claim 1, wherein the cutting step is performed via a water jet.

11. The method of claim 1, further comprising maintaining a sur-face temperature of the intermediate film for laminated glass (1) at 20 degrees Celsius or less.

* * * * *